US007477420B2

(12) United States Patent
Friedman et al.

(10) Patent No.: US 7,477,420 B2
(45) Date of Patent: Jan. 13, 2009

(54) BARLESS CLOSED LOOP COLOR CONTROL

(75) Inventors: Michael Friedman, Windsor, NJ (US); Manojkumar Patel, Princeton Junction, NJ (US); Bruce Westberg, Jamesburg, NJ (US); Piyushkumar Patel, Hamilton, NJ (US)

(73) Assignee: Innolutions, Inc., Windsor, NJ (US)

( * ) Notice: Subject to any disclaimer, the term of this patent is extended or adjusted under 35 U.S.C. 154(b) by 681 days.

(21) Appl. No.: 11/221,347

(22) Filed: Sep. 7, 2005

(65) Prior Publication Data

US 2007/0051161 A1 Mar. 8, 2007

(51) Int. Cl.
*G06F 15/00* (2006.01)
*G06K 1/00* (2006.01)
*H04N 1/46* (2006.01)
*B41F 31/02* (2006.01)

(52) U.S. Cl. ........................ 358/1.9; 358/504; 358/526; 101/365

(58) Field of Classification Search .................. 358/1.1, 358/1.4, 1.9, 504, 518, 526; 101/365, 368, 101/211, 417; 348/182
See application file for complete search history.

(56) References Cited

U.S. PATENT DOCUMENTS

| | | | | | |
|---|---|---|---|---|---|
| 5,285,297 | A | * | 2/1994 | Rose et al. | 358/518 |
| 5,339,176 | A | * | 8/1994 | Smilansky et al. | 358/504 |
| 5,543,922 | A | * | 8/1996 | Runyan et al. | 356/402 |
| 5,724,259 | A | * | 3/1998 | Seymour et al. | 382/199 |
| 5,781,206 | A | * | 7/1998 | Edge | 347/19 |
| 5,786,908 | A | * | 7/1998 | Liang | 358/518 |
| 5,877,787 | A | * | 3/1999 | Edge | 347/19 |
| 5,967,049 | A | | 10/1999 | Seymour et al. | 101/484 |
| 5,967,050 | A | | 10/1999 | Seymour | 101/484 |
| 5,992,318 | A | | 11/1999 | DiBello et al. | 101/181 |
| 6,027,201 | A | * | 2/2000 | Edge | 347/19 |
| 6,058,201 | A | * | 5/2000 | Sikes et al. | 382/112 |
| 6,318,260 | B1 | | 11/2001 | Chu et al. | 101/365 |
| 6,480,299 | B1 | * | 11/2002 | Drakopoulos et al. | 358/1.9 |
| 6,621,585 | B1 | * | 9/2003 | Patel et al. | 358/1.12 |
| 2005/0190389 | A1 | * | 9/2005 | Tanaka | 358/1.9 |
| 2005/0200866 | A1 | * | 9/2005 | Hoshii et al. | 358/1.9 |

* cited by examiner

*Primary Examiner*—Houshang Safaipour
*Assistant Examiner*—Jonathan R Beckley
(74) *Attorney, Agent, or Firm*—Roberts & Roberts, LLP

(57) ABSTRACT

A system and processes for the accurate measurement and control of image color values on a printing press with or without the presence of a color bar. More particularly, a barless color control system and processes for controlling the color quality of color images printed on a substrate online or offline, with or without a color bar printed on the substrate. The system provides an efficient and inexpensive method for barless closed loop color control and the processes are conducted without pixel-by-pixel comparisons.

27 Claims, 14 Drawing Sheets

BARLESS CLOSED LOOP COLOR CONTROL

BACKGROUND OF THE INVENTION

1. CD-ROM Appendix

The computer program listing appendix referenced, included and incorporated in the present application is included in a single CD-ROM appendix labeled “BARLESS CLOSED LOOP COLOR CONTROL” which is submitted in duplicate. The CD-ROM appendix includes 82 files. The computer program is incorporated herein by reference.

2. Field of the Invention

The present invention relates to a system for the accurate measurement and control of image color values on a printing press with or without the presence of a color bar. More particularly, the invention provides a barless color control system and processes for controlling the color quality of color images printed on a substrate online or offline, with or without a color bar printed on the substrate.

3. Description of the Related Art

Color perception of a printed image by the human eye is determined by the light reflected from an object, such as a printed substrate. Changing the amount of ink or other medium applied to a substrate changes the amount of color on the printed substrate, and hence the quality of the perceived image.

Each of the individual single images is produced with a specific color ink, referred to in the art as “primary colors” or “process colors”. A multi-colored printed image is produced by combining a plurality of superimposed single color printed images onto a substrate. To create a multi-colored image, inks are applied at a predetermined pattern and thickness, or ink density. The ink patterns are generally not solid, but are composed of arrays of dots which appear as solid colors when viewed by the human eye at a distance. The images produced by such arrays of colored dots are called halftones. The fractional coverage of the dots of a halftone ink pattern combined with the ink density is referred to as the optical density of the ink pattern. For example, when ink dots are spaced so that half the area of an ink pattern is covered by ink and half is not, the coverage of the ink pattern is considered to be 50%.

The color quality of a multi-colored printed image is determined by the degree to which the colors of the image match the desired colors for the image, i.e. the colors of a reference image. Hence, the obtained quality of a multi-color image is determined by the density of each of the individual colored images of which the multi-colored image is composed. An inaccurate ink density setting for any of the colors may result in a multi-colored image of inferior color quality. An offset printing press includes an inking assembly for each color of ink used in the printing process. Each inking assembly includes an ink reservoir as well as a segmented blade disposed along the outer surface of an ink fountain roller. The amount of ink supplied to the roller train of the press and ultimately to a substrate, such as paper, is adjusted by changing the spacing between the edge of the blade segments and the outer surface of the ink fountain roller. The position of each blade segment relative to the ink fountain roller is independently adjustable by movement of an ink control device such as an adjusting screw, or ink key, to thereby control the amount of ink fed to a corresponding longitudinal strip or ink zone of the substrate. The ink control mechanism includes any device that controls the amount of ink fed to a corresponding longitudinal strip or zone of the substrate. The ink control keys each control the amount of ink supplied to a respective ink zone on the substrate.

In the printing industry, color bars have been used for a long time to measure ink density. A color bar comprises a series of patches of different colors in each ink zone. To achieve a desired ink density for printed information on a substrate, the printing press operator measures the ink density of the color patch or patches in one or more ink zones. The ink density of a color is determined by the settings of the ink supply for the ink of that color. A printing press operator adjusts the amount of ink applied to the substrate to get a desired color having a desired ink density. Opening an ink key increases the amount of ink along its zone and vice versa. If the ink density of the patch is too low, the operator opens the ink key to increase amount of ink flowing to the substrate in the corresponding ink zone. If the ink density of the patch is too high, the operator closes the ink key to decrease the amount of ink flowing to the substrate. Generally, it is assumed that the change in color density of the patches also represents a similar change in the color density of the printed image. However, this assumption is not always correct. To adjust for this discrepancy, the press operator should take the color bar patch density only as a guide, while final color adjustments are made by visually inspecting the printed information, and also by measuring the color ink density, or color values, of critical areas in the print.

At the start of a printing run, the ink key settings for the various color inks must be set to achieve the appropriate ink density levels for the individual color images in order to produce multicolor images with the desired colors. Additionally, adjustments to the ink key settings may be required to compensate for deviations in the printing process of colors during a printing run. Such deviations may be caused by alignment changes between various rollers in the printing system, the paper stock, web tension, room temperature and humidity, among other factors. Adjustments may also be required to compensate for printing process deviations that occur from one printing run to another. In the past, such ink density adjustments have been performed by human operators based merely on conclusions drawn from the visual inspection of printed images. However, such manual control methods tended to be slow, relatively inaccurate, and labor intensive. The visual inspection techniques used in connection with ink key presetting and color control are inaccurate, expensive, and time-consuming. Further, since the required image colors are often halftones of ink combined with other ink colors, such techniques also require a high level of operator expertise.

Methods other than visual inspection of the printed image are also known for monitoring color quality once the press is running. Methods have been developed to control ink supplies based on objective measurements of the printed images. To conduct the task of color density measurement, offline density measurement instruments are available. Quality control of color printing processes can be achieved by measuring the optical density of a test target image. Optical density of various points of the test target image can be measured by using a densitometer or scanning densitometer either offline or online of the web printing process. Typically, optical density measurements are performed by illuminating the test target image with a light source and measuring the intensity of the light reflected from the image. For example, a press operator takes a sample of printed substrate with the color bars and puts it in the instrument. A typical instrument has a density scanning head traveling across the width of the color bars. After scanning, the instrument displays density measurements on a computer screen. Upon examining the density values on display and also examining the printed sample, the operator makes necessary changes to the ink keys. This procedure is repeated until satisfactory print quality is achieved.

To automate this task, online density measurement instruments are known. While the press is running, it is common for a press operator to continually monitor the printed output and to make appropriate ink key adjustments in order to achieve appropriate quality control of the color of the printed image. For example, if the color in a zone is too weak, the operator adjusts the corresponding ink key to allow more ink flow to that zone. If the color is too strong, the corresponding ink key is adjusted to decrease the ink flow. During operation of the printing press, further color adjustments may be necessary to compensate for changing press conditions, or to account for the personal preferences of the customer.

Online instruments comprise a scanning assembly mounted on the printing press. The test target image that is measured is often in the form of a color bar comprised of individual color patches. The color bar typically extends the width of the substrate (see FIG. 7). Typically, color bars are scanned on the printing press at the patches, which include solid patches and halftone patches for each of the primary ink colors, as well as solid overprints. The color bar is often printed in the trim area of the substrate and may be utilized for registration as well as color monitoring purposes. Each solid patch has a target density that the color control system attempts to maintain. The inking level is increased or decreased to reach this target density.

Instruments that can measure density on the press and also automatically activate ink keys on the press to bring color density to a desired value are commonly known as Closed Loop Color Controls. A Closed Loop Color Control is primarily used to perform three tasks. The first task is to analyze the image from pre-press information to find the coverage of different colors in different ink zones and preset the ink fountain key openings to get the printed substrate close to the required colors. Ink key opening presets are just an approximation and may not be a perfect setting. The second task is to analyze the color information scanned from the substrate being printed on the press, compare it with the desired color values and make corrections to the ink key openings to achieve the desired color values. The third task is to continuously analyze the printed substrate and maintain color values throughout the job run length.

Different density measuring instruments vary in the way they scan color bars and calculate color patch density. Different scanning methods can be categorized into two groups. A first group uses a spectrophotometer mounted in the imaging assembly. A video camera and strobe are used to freeze the image of moving substrate and accurately locate color bars. The spectrophotometer is then aligned to a color patch and it is used to take a reading of the color patch. For positioning color patches in the longitudinal Y direction of the substrate, a cue mark and a photo sensor are used. For distinguishing color patches from print, a special shape of color patch is required for this instrument. A second group uses video cameras mounted in an imaging assembly. Typically, a color camera with a strobe is used to freeze the motion of the moving substrate and acquire an image. Most manufacturers use a three sensor camera, in which prisms are used to split red, green and blue channels. Analog signals from these three channels are fed to frame acquiring electronics to digitize and analyze image.

Most manufacturers use xenon strobes for illuminating the moving substrate for a short period of time. Xenon strobes work on the principle of high voltage discharge through a glass tube filled with xenon gas. It is well known that the light intensity from flash to flash with such a device is not consistent. This becomes a problem in color measurement since variation in flash intensity provides false readings. To overcome this problem, a system described in U.S. Pat. No. 6,058,201 uses a light output measurement device in front of the strobe and provides correction in color density calculations. Another problem with xenon strobes is that they work with higher voltage and drive electronics generate electrical noise and heat. These features make it more difficult to package a camera and xenon strobe in a single sealed imaging assembly. Another prior system described in U.S. Pat. No. 5,992,318 mounts the strobe away from the camera and transmits light through a light pipe.

To overcome these problems, it is desirable to use white light emitting diode (LED) light strobes with a single sensor color camera to measure color values on the color bar to accomplish closed loop color operation on the press. White LEDs provide a light source with very consistent light from flash to flash. Also, the LEDs operate at a very low voltage and current. This reduces heat generation in the imaging assembly and it also eliminates electrical noise typically associated with xenon light strobes.

All of the above mentioned methods use a color bar with a combination of solid and tint patches to measure the color across the width of the substrate. Unfortunately, measuring the color of a printed substrate using a color bar has several disadvantages. First, it is an indirect method of measuring color in the print, whereby it is assumed that the change in color density of a patch in the color bar represents the change in the color value of the printed substrate in the longitudinal zone aligned with the measured patch. However, this assumption is not always correct. Second, the color bar requires additional space on the substrate. Depending on job configuration, this space may not be available.

Further, this additional substrate space is not part of the finished product, so it increases the cost of production. In addition, there are associated trimming costs for printed products for which a color bar is objectionable, thereby increasing the cost of the operation, as well as the costs associated with removing and disposing of trimmed color bar waste.

Alternatively, measuring the color of a printed substrate with a color bar does have its advantages. First, a color bar provides dedicated patches for each color that can be measured by the control as well as by the press operators using hand held color measuring instruments. Further, different types of patches (such as 25% tint, 50% tint, 75% tint, trap overprint) can be printed to check overall performance including pre-press settings, ink and water balance.

For different press configurations and job requirements, it may or may not be possible to have color bars. While a color bar may have some advantages, the job and press configuration may not allow having a color bar. In such a case, the operator has to adjust the press by visually inspecting the image or by measuring the color value within the print using a hand held densitometer, and the operator has to choose the places where he would like to measure the color value, and the densitometer readings may not be correct if colors are mixed in the area being inspected. Due to the obstacles associated with color bars, it is desirable to provide an option to eliminate the color bar and automate the image inspection to significantly improve the overall efficiency of the printing process.

Several attempts have been made to measure color values in an image directly from a printed substrate. A number of past efforts have been explored through which color information on a print can be acquired and analyzed. For example, U.S. Pat. No. 5,967,050 teaches a method which takes images of a printed substrate and aligns the obtained image with a reference image from available pre-press information and calculates color error on pixel-by-pixel basis. The operation requires a lot of computation power making it very expensive and slow. These requirements make it practically impossible to implement Closed Loop Color Control without a color bar.

Another method of getting color information in each key zone may involve taking multiple images in an ink zone and aligning and analyzing the images with the corresponding locations on the image information from the pre-press information on a pixel-by-pixel basis. This would also require a lot of computation power since images in the same ink zone have to be captured, aligned to the pre-press image, processed and analyzed.

Yet another method of getting the color information in each key zone is by positioning a camera in an ink zone, illuminating the region under camera with a constant illumination light source (i.e. non-strobing) and keeping the camera shutter open for a certain time. In order to get a correct color reading, the shutter opening and closing should be synchronized with the substrate movement such that the number of press repeats passing under the camera are exact multiples, otherwise color information for the partial press repeat scanned is also added to the reading. Since color values read from the camera are dependent on the amount of light received by the sensor in a specific time, this method becomes speed sensitive. Any variation due to change in speed has to be compensated mathematically or by changing the light illumination intensity. Both solutions suffer from inherent inaccuracies and errors making it practically very difficult to implement this solution. This system is further disadvantageous because the light reflected from non-printed areas also gets integrated into the frame. If there is heavy coverage of various colors, the resulting integrated frame shows a very dark and gray looking frame. If there is a very small area being printed on the key zone, the image of printed area gets diluted by the image of the non-printed area of the substrate to a point where the final frame may not be able to provide enough resolution information about the printed color.

A further method of obtaining color information in each key zone is by keeping the camera shutter open for a time greater than the time for one press repeat to pass under the camera and using a strobe light to illuminate several sections of the key zone and using the charge-coupled device (CCD) in the camera to accumulate the reflected color value for the whole repeat length. This method relies on the fact that the frame produced by such integration (multiple exposures) is a representative of total color in the ink zone area. The disadvantage of this system is that the light reflected from non-printed areas also gets integrated in the frame. If there is heavy coverage of various colors, the resulting integrated frame shows a very dark and gray looking frame. If there is a very small area being printed on the key zone, the image of printed area gets diluted by the image of the non-printed area of the substrate to a point where the integrated frame may not be able to provide enough resolution information about the printed color.

The present invention provides an improved approach to measure color values on a printed substrate, called Frame Analysis using Color Topography (FACT) method. The inventive FACT process allows for measurement and determination of color density variations, as well as for controlling the plurality of ink control mechanisms, or ink keys, on a printing press for on-the-run color correction whether a color bar is present or not. Most particularly, the inventive system and processes provide a solution to the longstanding need in the art for an efficient and inexpensive method for barless closed loop color control.

SUMMARY OF THE INVENTION

The invention provides a process for measuring and controlling the color value of one or more colored image portions which are printed on a planar substrate in a plurality of ink zones that extend across a width of the substrate, each colored image portion comprising one or more colors, wherein each color has a pure color value, the process comprising:

(a) providing one or more colored image portions which are printed on a planar substrate with a quantity of ink in a plurality of ink zones that extend across a width of the substrate, each colored image portion comprising one or more colors, wherein each color has a pure color value;

(b) providing a memory which contains pure color value information in digital form for each color;

(c) providing a pixellated digital representation of said one or more colored image portions, said pixellated digital representation being divided into a plurality of digital paths corresponding to each of said ink zones, each digital path comprising a plurality of digital zones, and said pixellated digital representation being further divided into one or more color layers, each color layer corresponding to one of said one or more colors, and wherein said pixellated digital representation comprises target color values that correspond to the quantity of ink required to reproduce the one or more colored image portions for each color within each ink zone on the substrate;

(d) analyzing each of the color layers within each of the digital paths to determine a maximum pixel population area for each color within each of said digital paths, the maximum pixel population area having position coordinates and comprising a location within a colored image portion within a digital zone of a digital path having a target color value that is the closest target color value to the pure color value for its corresponding color within its digital path, and storing the maximum pixel population area position coordinates and its color value in the memory;

(e) comparing and determining any difference between the target color value of said maximum pixel population area and the corresponding pure color value for each color, and storing said difference in the memory;

(f) providing at least one imaging assembly, which imaging assembly is capable of capturing digital representations of said one or more colored image portions;

(g) controlling the positioning and linear movement of said imaging assembly across the planar substrate;

(h) selecting and acquiring one or more digital images with the imaging assembly of said one or more colored image portions on the substrate at the maximum pixel population area location for at least one of said colors in at least one of said ink zones, thereby producing a digital image of the substrate at the maximum pixel population area; said digital image of the substrate at the maximum pixel population area having an actual color value for said at least one color in said at least one of said ink zones;

(i) analyzing the digital image of the substrate at the maximum pixel population area and measuring the actual color value for said at least one color;

(j) comparing and determining any difference between the actual color value and the pure color value, and storing said difference in the memory; and (k) optionally adjusting the ink quantity on the substrate in the corresponding ink zone such that the difference between the actual color value and the pure color value is equivalent to the difference between said target color value and said pure color value determined in (e).

The invention further provides a process for measuring and controlling the color value of one or more colored image portions which are printed on a planar substrate in a plurality of ink zones that extend across a width of the substrate, each colored image portion comprising one or more colors, wherein each color has a pure color value, the process comprising:

(a) providing one or more colored image portions which are printed on a planar substrate with a quantity of ink in a plurality of ink zones that extend across a width of the substrate, each colored image portion comprising one or more colors, wherein each color has a pure color value;

(b) providing a memory which contains pure color value information in digital form for each color;

(c) providing a pixellated digital representation of said one or more colored image portions, said pixellated digital representation being divided into a plurality of digital paths corresponding to each of said ink zones, each digital path comprising a plurality of digital zones, and said pixellated digital representation being further divided into one or more color layers, each color layer corresponding to one of said one or more colors, and wherein said pixellated digital representation comprises target color values that correspond to the quantity of ink required to reproduce the one or more colored image portions for each color within each ink zone on the substrate;

(d) analyzing each of the color layers within each of the digital paths to determine a maximum pixel population area for each color within each of said digital paths, the maximum pixel population area having position coordinates and comprising a location within a colored image portion within a digital zone of a digital path having a target color value that is the closest target color value to the pure color value for its corresponding color within its digital path, and storing the maximum pixel population area position coordinates and its color value in the memory;

(e) modifying the one or more colored image portions printed on the planar substrate by increasing or decreasing the quantity of ink in one or more of said ink zones, said modified one or more colored image portions having modified target color values;

(f) scanning the substrate with a scanner at each maximum pixel population area location and determining modified target color values for each of said maximum pixel population areas, and storing said modified target color values for each maximum pixel population area in the memory;

(g) comparing and determining any difference between the modified target color values of each maximum pixel population area and the corresponding pure color value for each color, and storing said difference in the memory;

(h) providing at least one imaging assembly, which imaging assembly is capable of capturing digital representations of said one or more colored image portions;

(i) controlling the positioning and linear movement of said imaging assembly across the planar substrate;

(j) selecting and acquiring one or more digital images with the imaging assembly of said one or more colored image portions on the substrate at the maximum pixel population area location for at least one of said colors in at least one of said ink zones, thereby producing a digital image of the maximum pixel population area; said digital image of the maximum pixel population area having an actual color value for said at least one color in said at least one of said ink zones;

(k) analyzing the digital image of the maximum pixel population area and measuring the actual color value for said at least one color;

(l) comparing and determining any difference between the actual color value and the pure color value, and storing said difference in the memory; and (m) optionally adjusting the ink quantity on the substrate in the corresponding ink zone such that the difference between the actual color value and the pure color value is equivalent to the difference between said modified target color value and said pure color value determined in (g).

The invention also provides a process for controlling the amount of ink fed from a plurality of inking units in a multi-colored printing press onto a planar substrate fed through the press, which substrate is in a web or sheet form, said substrate having one or more colored image portions printed thereon from the inking units, which image portions are printed across a width of the substrate in a plurality of ink zones, each colored image portion comprising one or more colors, wherein each color has a pure color value, the system being capable of functioning in the presence of or absence of a color bar, the process comprising:

(a) providing one or more colored image portions which are printed on a planar substrate with a quantity of ink in a plurality of ink zones that extend across a width of the substrate, each colored image portion comprising one or more colors, wherein each color has a pure color value;

(b) providing a memory which contains pure color value information in digital form for each color;

(c) providing a pixellated digital representation of said one or more colored image portions, said pixellated digital representation being divided into a plurality of digital paths corresponding to each of said ink zones, each digital path comprising a plurality of digital zones, and said pixellated digital representation being further divided into one or more color layers, each color layer corresponding to one of said one or more colors, and wherein said pixellated digital representation comprises target color values that correspond to the quantity of ink required to reproduce the one or more colored image portions for each color within each ink zone on the substrate;

(d) determining whether a color bar is present, which color bar comprises a plurality of color patches, wherein at least one color patch is printed in each ink zone, wherein each color patch comprises one or more color layers; and (e) if a color bar is not present, conducting step (I), and if a color bar is present conducting either step (I) or step (II):

(I) (f) analyzing each of the color layers within each of the digital paths to determine a maximum pixel population area for each color within each of said digital paths, the maximum pixel population area having position coordinates and comprising a location within a colored image portion within a digital zone of a digital path having a target color value that is the closest target color value to the pure color value for its corresponding color within its digital path, and storing the maximum pixel population area position coordinates and its color value in the memory;

(g) comparing and determining any difference between the target color value of said maximum pixel population area and the corresponding pure color value for each color, and storing said difference in the memory;

(h) providing at least one imaging assembly, which imaging assembly is capable of capturing digital representations of said one or more colored image portions;

(i) controlling the positioning and linear movement of said imaging assembly across the planar substrate;

(j) selecting and acquiring one or more digital images with the imaging assembly of said one or more colored image portions on the substrate at the maximum pixel population area location for at least one of said colors in at least one of said ink zones, thereby producing a digital image of the maximum pixel population area; said digital image of the maximum pixel population area having an actual color value for said at least one color in said at least one of said ink zones;

(k) analyzing the digital image of the maximum pixel population area and measuring the actual color value for said at least one color;

(l) comparing and determining any difference between the actual color value and the pure color value, and storing said difference in the memory; and (m) optionally adjusting the ink quantity on the substrate in the corresponding ink zone such that the difference between the actual color value and the pure color value is equivalent to the difference between said target color value and said pure color value determined in (g);

(II) (n) providing at least one imaging assembly, which imaging assembly is capable of capturing digital representations of said one or more colored image portions;

(o) controlling the positioning and linear movement of said imaging assembly across the planar substrate;

(p) selecting and acquiring one or more digital images with the imaging assembly of one or more of said color patches, thereby producing a digital image of the one or more color patches; said digital image of the one or more color patches having an actual color value for each of its one or more color layers;

(q) analyzing the digital image of the one or more color patches and measuring the actual color value for said one or more color layers;

(r) comparing and determining any difference between the actual color value and the pure color value, and storing said difference in the memory; and (s) optionally adjusting the ink quantity on the substrate in the corresponding ink zone such that there is no difference between the actual color value and the pure color value.

The invention still further provides a color control system for measuring and controlling the color value of one or more colored image portions which are printed on a planar substrate in a plurality of ink zones that extend across a width of the substrate, each colored image portion comprising one or more colors, wherein each color has a pure color value, the system comprising:

(a) one or more colored image portions which are printed on a planar substrate with a quantity of ink in a plurality of ink zones that extend across a width of the substrate, each colored image portion comprising one or more colors, wherein each color has a pure color value;

(b) a memory for storing pure color value information in digital form for each color, and for storing a pixellated digital representation of said one or more colored image portions, said pixellated digital representation being divided into a plurality of digital paths corresponding to each of said ink zones, each digital path comprising a plurality of digital zones, and said pixellated digital representation being further divided into one or more color layers, each color layer corresponding to one of said one or more colors, and wherein said pixellated digital representation comprises target color values that correspond to the quantity of ink required to reproduce the one or more colored image portions for each color within each ink zone on the substrate;

(c) a first analyzer for analyzing each of the color layers within each of the digital paths to determine a maximum pixel population area for each color within each of said digital paths, the maximum pixel population area having position coordinates and comprising a location within a colored image portion within a digital zone of a digital path having a target color value that is the closest target color value to the pure color value for its corresponding color within its digital path, which maximum pixel population area position coordinates and its color value are stored in the memory;

(d) a first comparator for comparing and determining any difference between the target color value of said maximum pixel population area and the corresponding pure color value for each color, which difference is stored in the memory;

(e) at least one imaging assembly, which imaging assembly is capable of capturing digital representations of said one or more colored image portions;

(f) a controller for controlling the positioning and linear movement of said imaging assembly across the planar substrate;

(g) a selector for selecting and acquiring one or more digital images with the imaging assembly of said one or more colored image portions on the substrate at the maximum pixel population area location for at least one of said colors in at least one of said ink zones, thereby producing a digital image of the maximum pixel population area; said digital image of the maximum pixel population area having an actual color value for said at least one color in said at least one of said ink zones;

(h) a second analyzer for analyzing the digital image of the maximum pixel population area and measuring the actual color value for said at least one color;

(i) a second comparator for comparing and determining any difference between the actual color value and the pure color value, which difference is stored in the memory; and (j) an adjuster for optionally adjusting the ink quantity on the substrate in the corresponding ink zone such that the difference between the actual color value and the pure color value is equivalent to the difference between said target color value and said pure color value.

DETAILED DESCRIPTION OF THE INVENTION

The invention provides a system and processes for measuring and controlling the color values of one or more colored images or colored image portions during operation of a printing press, such as sheet fed and web presses, and offset and other printing processes. The images comprise one or more colors and are printed on a moving, planar substrate in a plurality of ink zones that extend across a width of the substrate. An imaging assembly selects and acquires images of a moving substrate, determines a relationship between actual and target color values, and automatically makes any necessary ink quantity adjustments.

A typical rotary printing process utilizes printing cylinders having printing plates attached thereto. Conventionally, a positive or negative image is put onto a printing plate using standard photomechanical, photochemical or laser engraving processes. Ink is then applied to the plate's image area and transferred to the substrate. A single printing plate is generally used for each color used in forming the image. In a typical printing operation, printed images are formed from a combination of overlapping color layers of the process colors cyan, magenta, yellow and black. Accordingly, at least four printing plates are typically used, one for each of those colors. Non-process colors may also be added to the color image by the use of additional plates.

Figure 10:
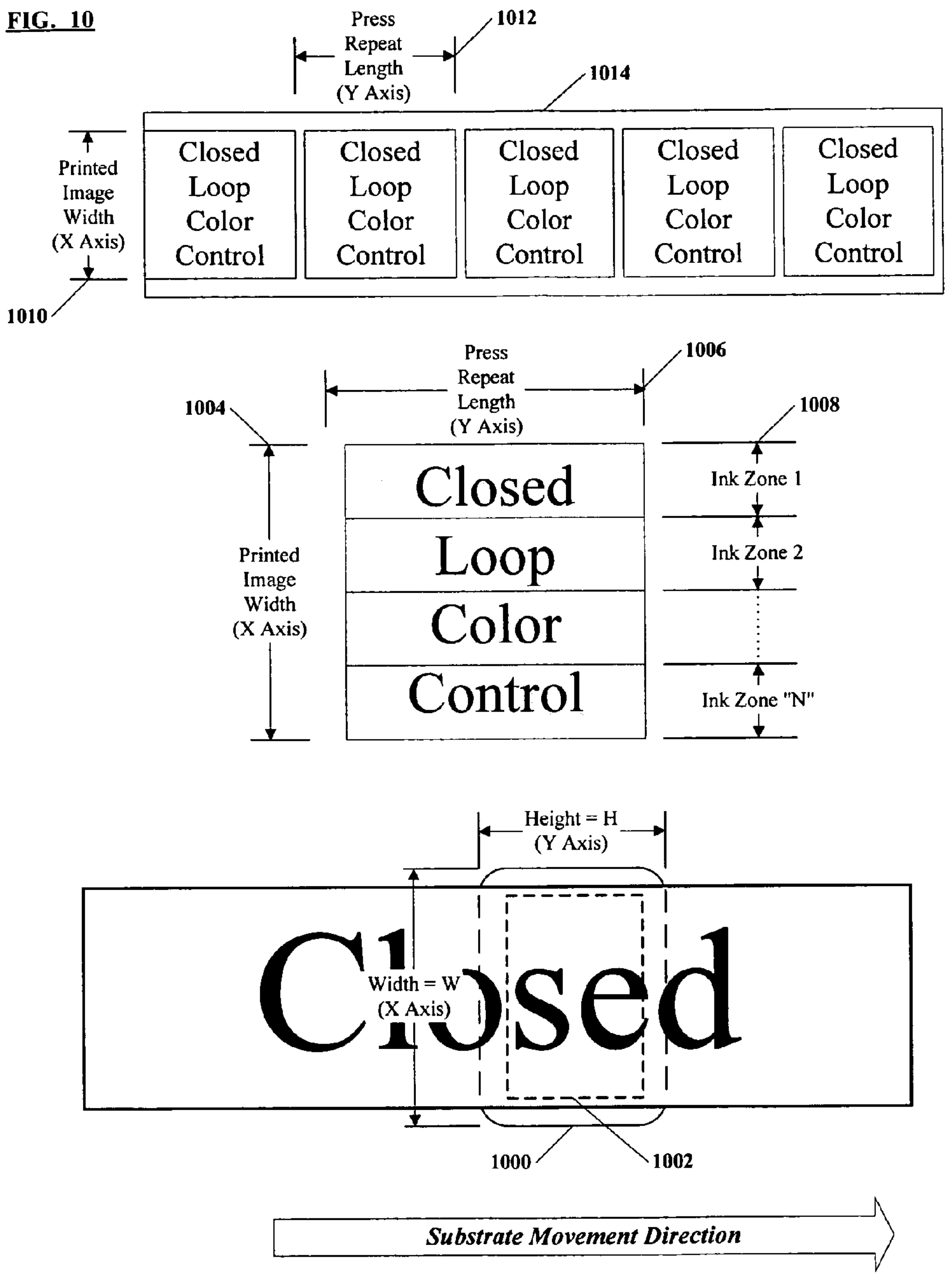
FIG. 10 illustrates the typical nature and layout of print and ink zones on the substrate.

As is well known in the art, when using a printing press, an image is repeatedly printed on a substrate and the print repeat length is equal to the circumference of the printing cylinder. In a typical printing press, an ink fountain provides the ink for the printing operation. The ink fountain has several ink keys across the width of the fountain. Each ink key can be individually opened or closed via an ink control mechanism to allow more or less ink onto the corresponding ink zone (conventionally longitudinal) on the substrate. FIG. 10 offers an illustration of a substrate divided into multiple ink zones. Ink from the ink fountain travels down an ink train through distributor rollers. Any change in the setting of an ink key will affect the whole longitudinal path aligned with the ink zone. A typical printing press also has oscillator rollers. In addition to rotational motion, these oscillator rollers also have axial motion moving back and forth. The axial motion spreads ink along the ink zone to the adjacent ink zones.

The Frame Analysis using Color Topography method of the invention involves several steps. First, a pixellated digital representation of the one or more colored images or image portions to be printed is generated or provided from known pre-press information. This pixellated digital representation is a digital reproduction of the desired image or images to be printed on the substrate and represents target color values that correspond to the quantity of ink required to reproduce the one or more colored image portions for each color within each ink zone on the substrate. Typically, the pixellated digital representation is provided from pre-press software containing information about the image or images in CIP3 industry standard format. Pre-press information is generally available through software provided by the designer of the image or images being reproduced on a substrate.

This information can also be derived using other well known means, such as by scanning the printing plates for each color of the image or images to obtain a digitized representation thereof. Color information in red, green, blue (RGB) color separations about the printed image is generally available from the pre-press software in various industry standard formats, including TIFF, JPEG, BMP, and PDF formats. Color information in cyan, magenta, yellow, black (CMYK) color separations is also typically available from the pre-press software in industry standard formats, including CIP3 and CIP4 formats, or may be converted to said standard formats. A pixellated digital representation may also be generated by scanning the printing plates or by scanning the actual printed image on the substrate if pre-press information is unavailable. All of this information, i.e. the pixellated digital representation and target color values, is stored on a computer memory from which it may be accessed as necessary.

Figure 14:
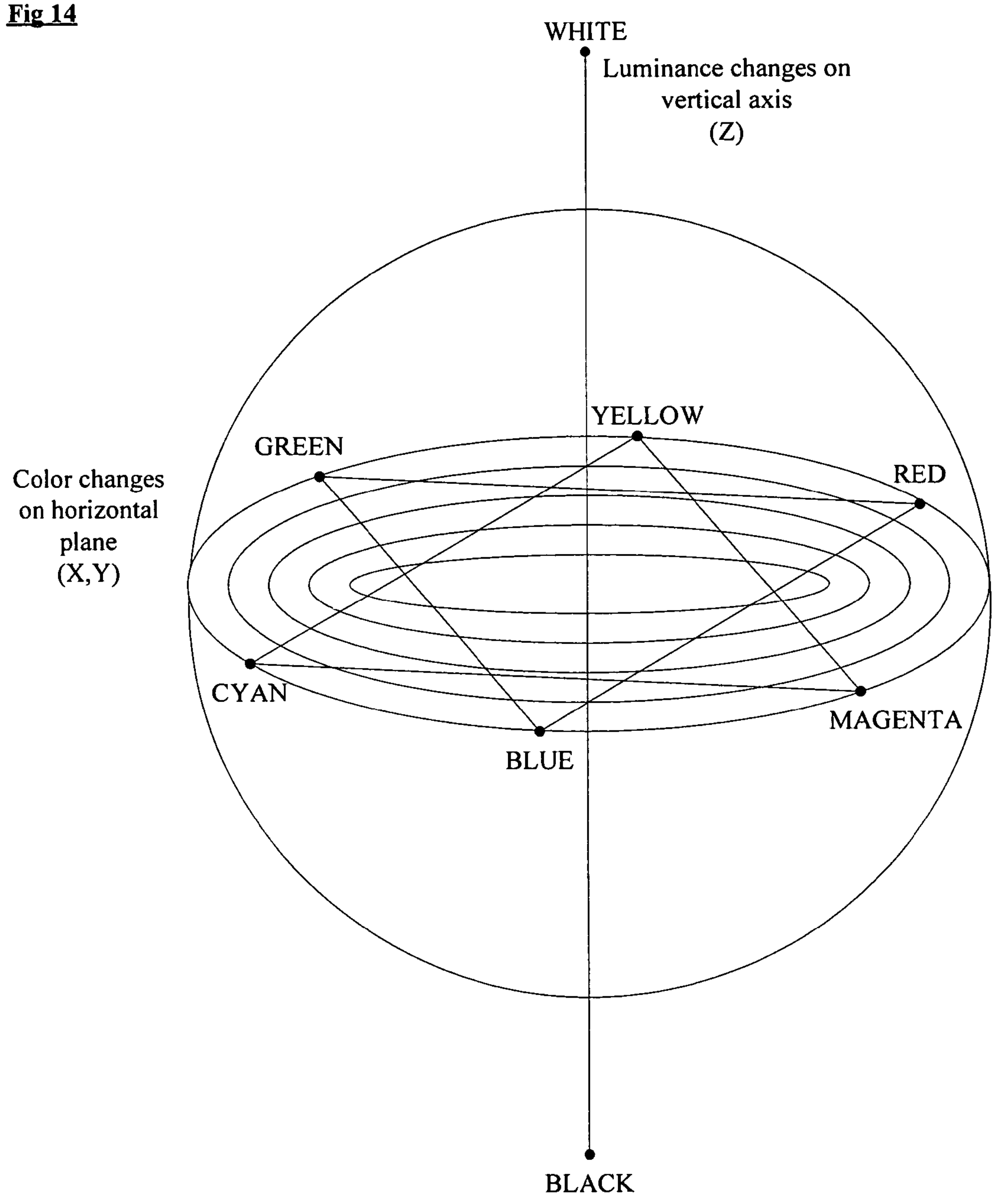
FIG. 14 is an illustration of the color coordinate system used to compare colors according to the invention.

As discussed herein, a printing press functions by applying ink from a plurality of ink keys onto a substrate in a plurality of ink zones that extend across a width of the substrate. Accordingly, the pixellated digital representation representing the printed information on the substrate is correspondingly divided into a plurality of digital ink zones or "digital paths" that correspond to each of said ink zones. Each digital path is also further divided into a plurality of digital zones. As used herein, an "ink zone" refers to an area of the substrate extending across a width of the substrate, and the term "digital path" refers to a digital representation of that ink zone, and a "digital zone" refers to any portion of a digital path. The pixellated digital representation is also divided into one or more color layers, each color layer corresponding to one of said one or more colors that make up the printed image, such as cyan, magenta, yellow and/or black. Each of these "pure colors" has a pure color value which is stored on said computer memory. As used herein, a "pure color value" describes a color value assigned to a color such as cyan, magenta, yellow or black, that does not include any other color component. For example, pure cyan contains no magenta, yellow or black, while pure magenta contains no cyan, yellow or black, etc. Referring to FIG. 14, each "pure color value" corresponds to particular mathematical coordinates on the illustrated 3-dimensional color space representation, also known as a color sphere. Each of the target color values from the pixellated digital representation are also represented by color coordinates on this 3-dimensional color sphere. These "color coordinates" are not to be confused with "position coordinates" which refer to an X and Y position or positions in the pixellated digital representation and, correspondingly, on the substrate to which the imaging assembly is directed. Further, for the purposes of this invention, the term "color value", as used in regard to the pixellated digital representation, refers to digital mathematical coordinates for a particular color on said color sphere from a digitized representation of a printed image. The term "color values", as used in regard to the printed substrate, refers to color ink density of ink on the substrate.

In the next step, FACT, each digital path of the pixellated digital representation is then analyzed for the coverage of each color present. More specifically, each digital path is analyzed to determine a location within the path that has a highly condensed pixel population for one of the pure colors that make up the image. This highly condensed pixel population area, referred to herein as a "maximum pixel population area", will have a target color value that is closest to the pure color value for its corresponding color within its digital path. This analysis is conducted for each color in each of said digital paths. Accordingly, the pixellated digital representation will be analyzed to determine at least one maximum pixel population area per digital path for each of the pure colors within the path, e.g. cyan, magenta, yellow and black colors. Once a maximum pixel population area is located, the system computer will compare its color value (i.e. the target color value) to the pure color value of its corresponding pure color, and will determine a difference, if any, between the target color value and the pure color value. It is this difference that will then be effectively controlled and maintained during the running of the press. More particularly, once the locations of the maximum pixel population areas are determined, their position coordinates will be stored in the computer memory, and their color values will be used as a reference during operation of the color control system. Particularly, during the running of the press, their color values will be monitored to maintain the known difference between the pure color value and the target color value constant. During subsequent scans of the printed substrate using the imaging assembly of the invention, images will be taken of the substrate at the locations corresponding to the maximum pixel population areas and the images will be analyzed to determine actual color values of the print for each color present. The system computer will then determine the difference, if any, between the actual color value and the pure color value for each color present in the ink zone. If this difference is not equivalent to the difference previously measured between the target color value and the pure color value, an ink quantity adjustment will automatically be made on the substrate in the corresponding ink zone such that the difference between the actual color value and the pure color value is equivalent to the difference between said target color value and said pure color value for the proper color or colors. This process may be repeated continuously during the entire printing operation as may be desired. This method is a much simpler and quicker process than conducting pixel-to-pixel comparisons of pixel target and actual pixel colors.

It should be understood that a press operator may also override the target color values provided by the pre-press software or otherwise generated, modify the colors being printed on the substrate, and then maintain the modified colors. If the colors are so modified, the substrate is then scanned with a scanner, e.g. the imaging assembly or other scanner, to determine modified color values, which are then monitored in the same manner as the target color values as described. It should be further understood that the target color value may be affected by the characteristics of the substrate being printed on, e.g. matte or glossy paper, and this must be further taken into consideration in determining the target color values. Typically, these substrate specific considerations will be taken into consideration by system software simply by registering the substrate type being used. In the preferred embodiment of the invention, an optical scatter computation and correction is also conducted for both barless and color bar readings.

In one preferred embodiment of the invention, the imaging assembly will also recognize and adjust for any physical movement of the substrate during the printing operation. Particularly, during the printing operation, the imaging assembly will take an image of a predetermined area to identify a unique locator mark that is printed by the press on each repeat cycle. The position coordinates of the locator mark are determined by the system computer and are preferably specified by an operator during the print job setup. After identifying the locator mark, any offset in the physical position of the locator mark is noted. These offsets are considered for accurately positioning the imaging assembly to keep alignment between the imaging assembly position and printed area corresponding to the ink zones. This may be performed on a regular basis to ascertain the alignment between the imaging assembly position and printed area corresponding to the ink zones. This is required because the path of the paper through the press is known to vary due to both press related and outside influence. This alignment step may also be performed after specific events on the press that may disturb the position of the substrate circumferentially or laterally. Some of the examples of such events are substrate roll splicing and blanket washing. The steps described above of taking images to determine actual color values and making any necessary adjustments, are continuously performed on the press for the complete job run length.

The system and processes of the invention are described with greater specificity below. A preferred apparatus for use in the present invention is described in commonly owned U.S. patent application Ser. No. 10/234,304, which is incorporated herein by reference in its entirety. The system of the invention, Barless Closed Loop Color Control (BCC), preferably comprises one imaging assembly per surface scanned. Each preferred imaging assembly, FIGS. 6A, 8A, 610, 612, preferably comprises the following:

1. A commercially available color camera, FIG. 8A, 806 (e.g. Sony DFW-VL500). The camera preferably uses industry standard IEEE1394 (Firewire) interface for setup as well as transferring the image into a computer. No special frame grabber or other hardware is required to transfer the image from camera. The camera preferably has built in motorized zoom, motorized iris and motorized focus control that can be easily controlled using the IEEE1394 interface from the computer. Each camera has a unique serial number stored in its memory and is individually addressable. The exposure and other image processing are manually controllable to ensure precisely repeatable images from frame to frame. Finally, the camera may be triggered at a precise time, with accuracy to microseconds, to ensure capturing the desired color sample.
2. An illumination source, FIG. 5, FIGS. 8A-8C, 812: To overcome problems of xenon strobes, white LED light strobes are preferably used to freeze the image of a moving substrate, i.e. a substrate in motion on a printing press. Since white LEDs are available with different color temperature specifications, a grade suitable for the optimum setting of the camera is selected and white balance is achieved by manually setting camera parameters. Very bright LEDs are available and preferred. The light assembly can have one point light source, FIG. 8, 820, or an array of multiple light sources, FIG. 8, 840, to provide the required strobe light brightness. In general, any illumination source may be used, but white LED light strobes as described herein is the most preferred illumination source.

Camera trigger pulse width and its timing relationship to the strobe are very important. The strobe's electronics will condition the input trigger signal for appropriate camera triggering. Power for the imaging assembly is preferably provided from a commercially available 24 VDC switching power supply. A trigger input signal is generated by a counter board mounted in the computer, FIG. 1, 100, driven from a quadrature encoder, FIG. 1, 126, coupled to one printing cylinder on the press. This is used to synchronize the camera to the printed image in order to obtain the desired color samples.

Figure 6A:
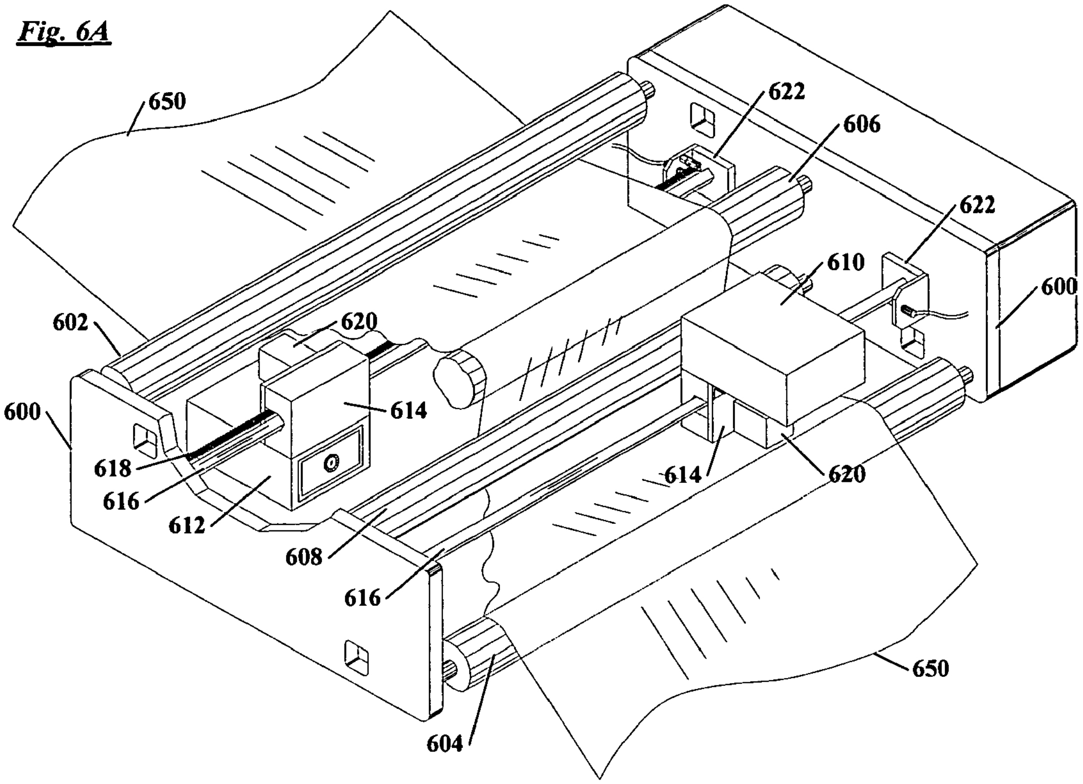
FIG. 6A and FIG. 6B are perspective and side views of equipment for scanning a printed substrate by mounted strobes and cameras.

Each imaging assembly further preferably comprises a linear drive for moving the illumination source and digital camera together across the substrate. This linear drive allows the imaging assembly to be moved in a direction perpendicular to the direction of travel of a moving substrate, and allows the imaging assembly to move in two orthogonal directions relative to a surface of a stationary substrate. In the preferred embodiment, each imaging assembly is preferably mounted on a carrier bracket moving on a track and guide system, FIG. 6A, 622. A linear drive in the form of a motor with an embedded microcontroller, FIG. 6A, 620, is preferably installed on the carrier bracket (see FIG. 6). A timing pulley is preferably installed on the shaft of the motor. A stationary timing belt is preferably installed with two ends anchored to the brackets near the opposite ends of travel of the imaging assembly. A proximity sensor preferably is provided at one or both ends of the track and allows the system to sense the end of travel for the imaging assembly. The motor preferably communicates with the computer through an RS-485 network, FIG. 1, 140. All devices on the RS-485 network are preferably individually addressable. Each imaging assembly motor is programmed with a different network address and performs independently of the other motors and assemblies.

Figure 1:
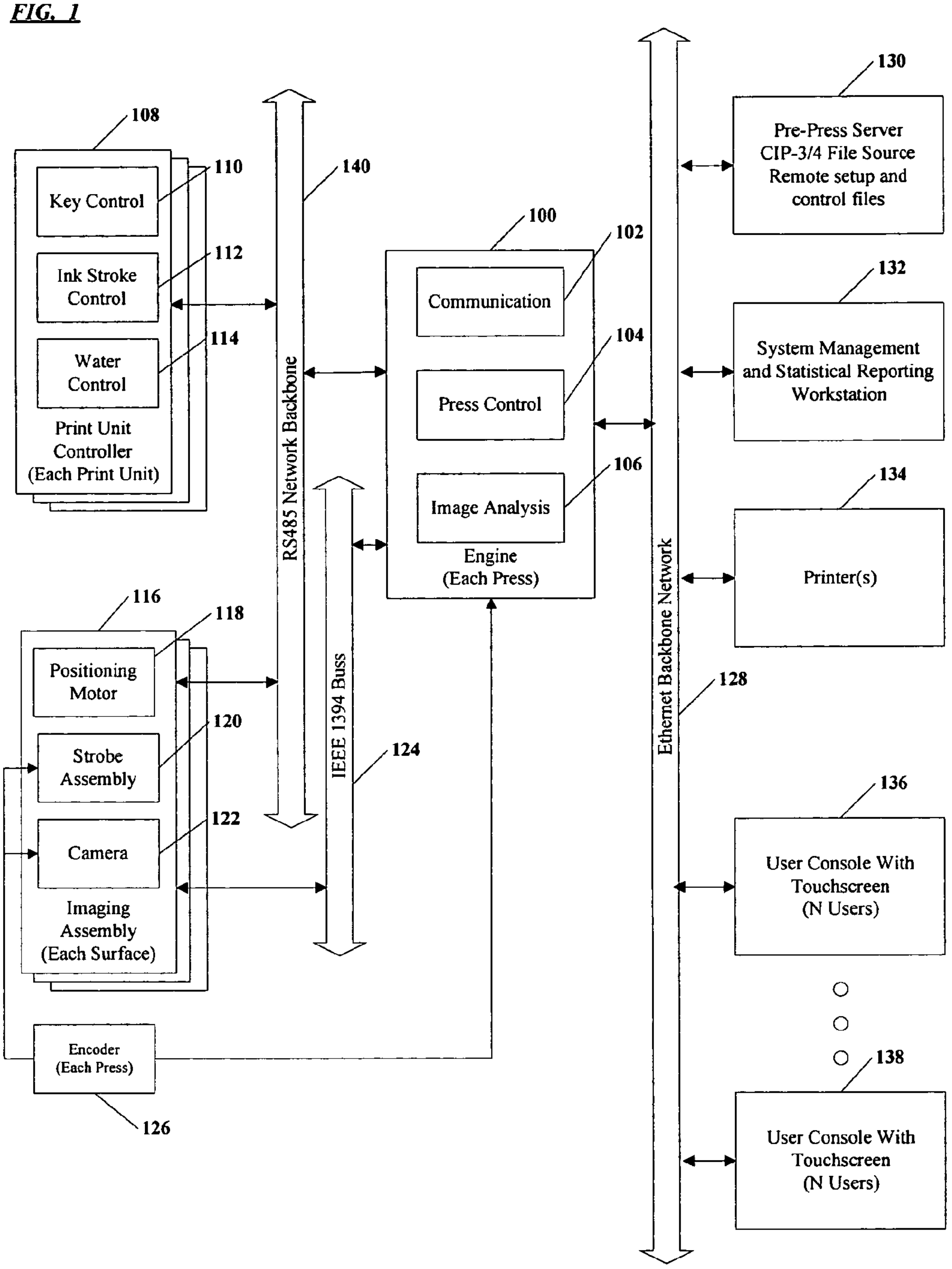
FIG. 1 is a flowchart showing a system overview of the inventive barless color control system.

The BCC engine is a computer, FIG. 1, 100, that preferably comprises the following items:

1. A Pentium® processor based motherboard. It also incorporates serial ports, parallel ports, a floppy disk controller, hard drive controller, USB ports and expansion slots.
2. A power supply for supplying appropriate DC power as required.
3. A hard disk drive for permanently storing the operating system, application programs and data.
4. A CD-ROM drive to accept portable and/or transient programs and data.
5. A floppy disk drive to accept portable and/or transient programs and data.
6. A video controller board and display monitor to provide the user interface.
7. An IEEE1394 (Firewire) interface card with multiple ports to communicate with cameras.
8. An Ethernet networking interface card to communicate with consoles and other devices on the network.
9. A USB port to interface with other devices.
10. An Input/Output board to interface with the printing press and other devices.
11. A counter board to take quadrature and index signals from the encoder and provide trigger signals to the appropriate imaging assembly.

An external RS-232 to RS-485 converter is preferably provided for communication with the imaging assembly positioning motors and print unit controllers in the system. While RS-232 is the standard for personal computers, the RS-485 standard provides additional margins against communications errors and increased signaling distance in the industrial environment. Single or multiple user consoles, FIG. 1, 136, 138, with touch screens preferably communicate with the engine using the Ethernet backbone, FIG. 1, 128.

The engine also communicates with one or more print unit controllers (PUCs) (see FIG. 3) to set and read ink key positions, water settings, ink stroke settings and other print unit functions. In addition to this, the print unit controller reports any faults and exceptions information to the engine. The engine can communicate with PUCs manufactured by any provider with a suitable protocol.

The engine can also communicate with a pre-press system, FIG. 1, 130, to get job settings, printed image data and ink key presetting data. The standard format in the industry is called the CIP3 file format, but other file formats can also be used to communicate job specific details from the pre-press software to the engine.

A console preferably comprises a computer with an Ethernet network adapter and a touch screen. All common operations for the system are performed using the touch screen of the console, though some maintenance operations may need to be performed directly on the engine using its local keyboard, mouse and video screen. The console application program can also run on the same hardware as the engine. In such a case, an additional separate computer will not be required for the console.

An encoder is installed on the printing press coupled to the printing cylinder. The encoder has three channels—channel A, channel B and channel Z. Channels A and B are in a quadrature relationship with each other. Typical channel resolution is 2500 pulses per revolution of the encoder shaft yielding 10,000 pulses per revolution of encoder shaft. Channel Z provides one index pulse per revolution of the encoder shaft. All three channel signals are connected to the counter board in the engine. The function of the counter board is to reliably count each encoder pulse and provide accurate print cylinder position information. The engine can set at least one count value into the counter board per printed surface. When the encoder count matches this value, the counter board activates an output trigger pulse for the corresponding surface, initiating image acquisition from the camera and illumination source, e.g. strobe. Thus, the image location may correspond to anywhere on the printed substrate and the engine will still be able to synchronize the imaging assembly.

Printing press interface signals are read and set using the Input/Output board. Typical signals read from the press are press printing, blanket wash, and press inhibit. These are used to determine when accurate imaging may commence. Outputs from the system are provided to reset the imaging assemblies, and produce quality alarms and scan error alerts. Based on press installation requirements, the Input/Output board may be substituted with USB based or other I/O devices performing the same function.

The invention further comprises a display screen for presenting a visual representation of information, including the one or more colored image portions, the maximum pixel population area, the actual, target and pure color values, a comparison of the color values, or combinations thereof. This display screen preferably comprises said console.

Figure 7:
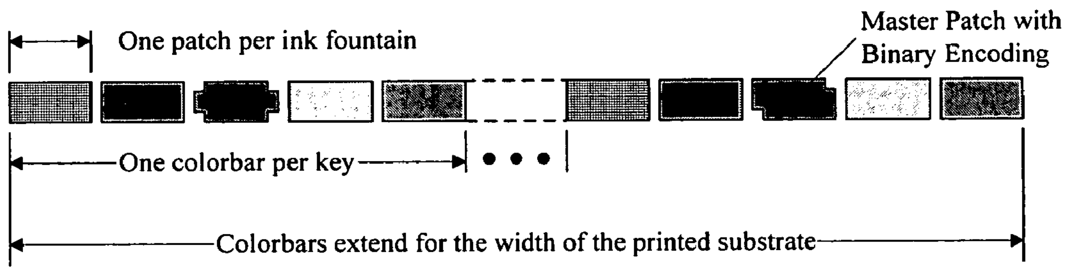
FIG. 7 is a schematic representation of color bars and color patches, which are printed on a substrate.

The BCC apparatus is able to function both in the presence of a color bar and in the absence of a color bar. Illustrated in FIG. 7 is a schematic representation of a color bar, wherein a single color bar has a plurality of color patches. Color bars are printed on each image produced by the printing press in order to obtain representative samples of pure color from each print unit. A color bar pattern typically, but not necessarily, repeats for each ink key in the print fountain. These patches are scanned by the imaging assembly and the resulting color values are used to determine the correct ink key settings.

Using one of the consoles of the invention, a press operator sets up following job specific details:

1. Color printed by each fountain in a system.
2. Fountain to surface relation.
3. Color of a color bar master patch or a locator mark.
4. If the job uses color bar or the job would run in barless mode.
5. If the job uses color bar, the location of color bar from leading edge of the print.
6. If the job does not use color bar, the location of the locator mark from the lead edge of the printing plate and from the operator edge of the printing plate.
7. Starting and ending ink zone location for imaging assembly scanning.
8. Location for multiple regions of interest (X and Y coordinates) for each surface in the system.

9. If the job uses a color bar, the configuration specifying following details for each patch in ink zone in the system:
   (a) Color of each patch (Cyan/Magenta/Yellow/Black/Special color)
   (b) Type of patch (Solid/50% density/75% density/clear/trap/etc.)
10. The target color values for each color to be printed.
11. Type of substrate (paper) to be printed upon (coated/newsprint/etc.)
12. CIP3 or other file type available from pre-press software to provide coverage data for each color being printed on each surface of the substrate. This information is used to determine ink key preset and ink stroke preset. This information is also used in the barless mode to determine the most suitable location to scan for each color in each ink zone. This information may also be obtained by separately scanning the substrate to determine target color values.

Job files are preferably edited locally on the user console and therefore can be created or changed independently of the job running on the engine. After editing, all job files are preferably saved on a central file server memory which may be physically co-located with the engine or console, or which may exist independently on the network. When the operator is ready to run a job, he selects from the list of stored jobs and touches the RUN button on touch screen. Preset values of ink keys, ink stroke and water are communicated to the print unit controllers which in turn sets up the printing press. The engine also preferably polls each PUC periodically to confirm that communication link is alive and also to read back positions of controlled ink keys, ink stroke and water settings, PUC status and alerts. The communication protocol between the engine and PUC depends on the specific requirements of different makes of PUCs.

Figure 11:
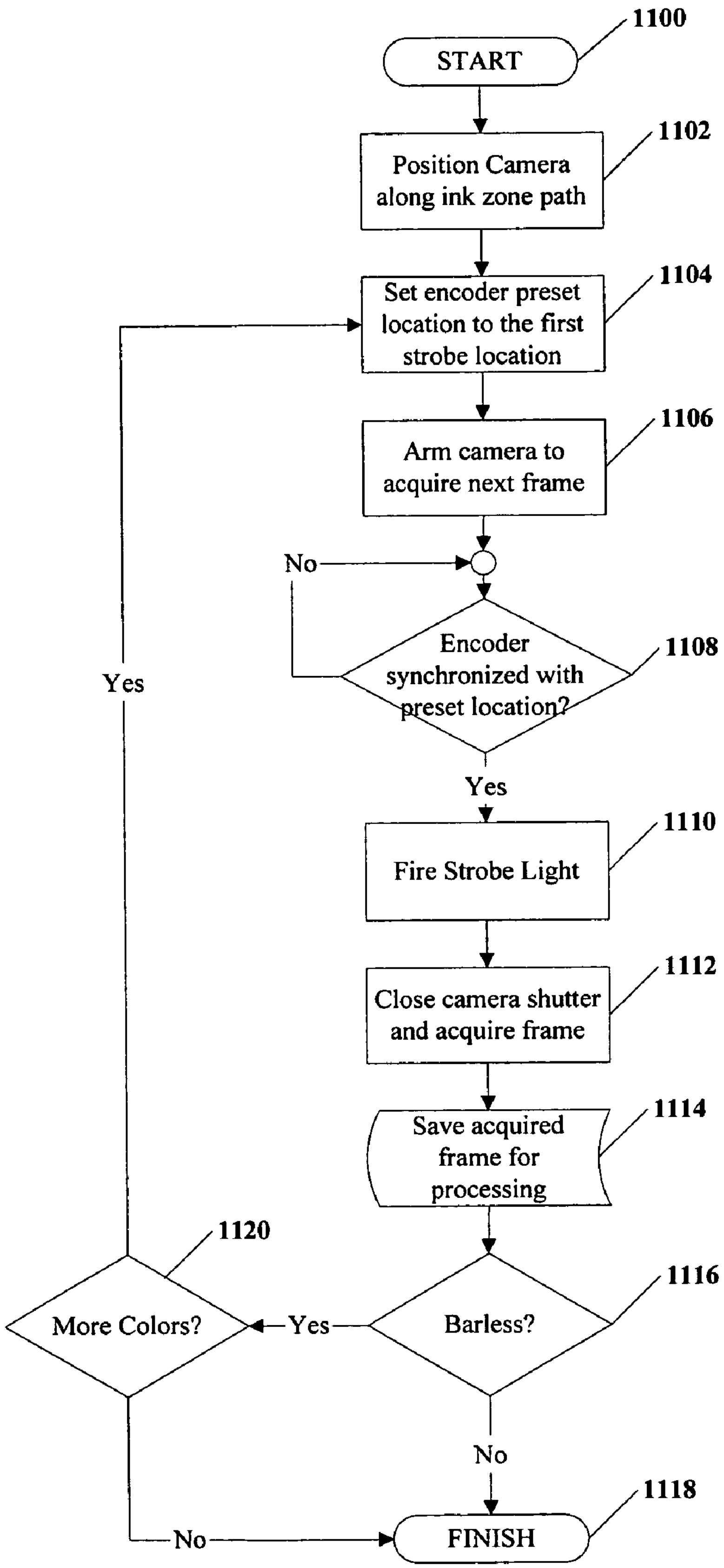
FIG. 11 is a flowchart illustrating the image acquisition process for getting color information for each key zone according to the invention.

The operator can place one or multiple surfaces in AUTO mode. There are three different startup options for the AUTO mode: Ideal, Current and Last. “Ideal mode” brings all ink color values to those defined in the job file. “Current mode” reads the ink color values presently being printed and maintains these values. “Last mode” assigns the color values which were used when this job was running last in AUTO mode. Preferably, the engine automatically saves all job settings and ink color values. When the operator starts printing on the press, the BCC apparatus gets a press printing signal from press. After a user defined (set by changing parameters) delay, which allows the printed image to stabilize, the BCC engine sends commands to each imaging assembly motor to position the imaging assembly at a specific location. BCC also polls these motors to confirm that the required move is accomplished. The corresponding strobe board processes the trigger signal and image acquisition is initiated through IEEE 1394 driver software. The acquired image is preferably stored in the random access memory (RAM) of the engine. Further processing of the acquired image, see FIG. 11, is performed based on the “color bar mode”, see FIG. 2, or “barless mode”, see FIG. 13, of job operation.

As previously mentioned, the BCC apparatus is able to function both in the presence of a color bar and in the absence of a color bar. If the job uses a color bar, the BCC apparatus loads a count corresponding to the color bar location into the counter board and commands the counter board to start trigger pulses for image acquisition. Image analysis is performed to identify the color bar in the acquired image. If a color bar is not found in the acquired image, the engine changes the count in the counter board to advance or retard the area of the printed image visible to the imaging assembly. The search distance along the Y axis of the substrate is programmable with engine parameters. When a valid color bar is found in an acquired image, its location is stored for use. Next, a master color patch is preferably identified in the color bar and its location is saved. A master patch is a visually distinct color patch within a color bar that is typically printed in the center of the group of patches associated with a particular key zone. Whereas the typical color patch is a simple rectangle, the master patch’s corners are missing in distinct and unique patterns. These patterns form a 4 bit binary encoded value which increments and repeats in a predetermined fashion across the substrate in successive ink zones. The binary code is derived by assigning a place value to each missing corner of the rectangle, allowing 15 unique codes. The 16th code is zero, which of course is a simple rectangle. The system uses the presence of this binary coded master patch as a confirmation check, along with its color, that the patches are correctly centered in a key zone. Further, the sequence of the binary codes ensures that the particular group of patches is aligned with the correct key zone, and not its neighbor. This corrects problems on the printing press caused by lateral movement of the substrate and also deliberate offsets introduced by the press operators to align substrate to various operations on the press unrelated to the BCC.

Once the master patch is located, the imaging assembly is then preferably moved such that the master patch moves to a specific location in the field of view. This operation aligns the imaging assembly to the patch group from a specific ink zone. Next, the imaging assembly is preferably moved along the X axis (in a direction perpendicular to the moving substrate) by one key zone at a time until the color bar patches disappear. The last location where a valid color bar was found becomes one extreme of the scanned area of the substrate. The opposite end of the substrate along the X axis becomes the other extreme of the scanned area of the substrate. Once these extremes are located and stored, sequential scanning of all of the ink zones commences.

In the color bar mode, color bar location, type and size of the patches are very important factors in accurate and efficient color measurement. It is important for the computer engine to be able to quickly and accurately locate the position of each patch on the color bar from the image provided by the camera. The color bar must be distinguished from the surrounding printed material. Some existing equipment requires that a white border of some predetermined minimum width must surround the color bar. Others use unique geometric shapes or cutouts embedded within the color bar. The recognition algorithm according to the present invention allows the color bar patches to be simple rectangles of any size or proportion specified in advance. Additionally, the surrounding printed material is irrelevant to the recognition of the color bars and may therefore directly adjoin them with no bordering area, i.e. “full bleed”.

Figure 2:
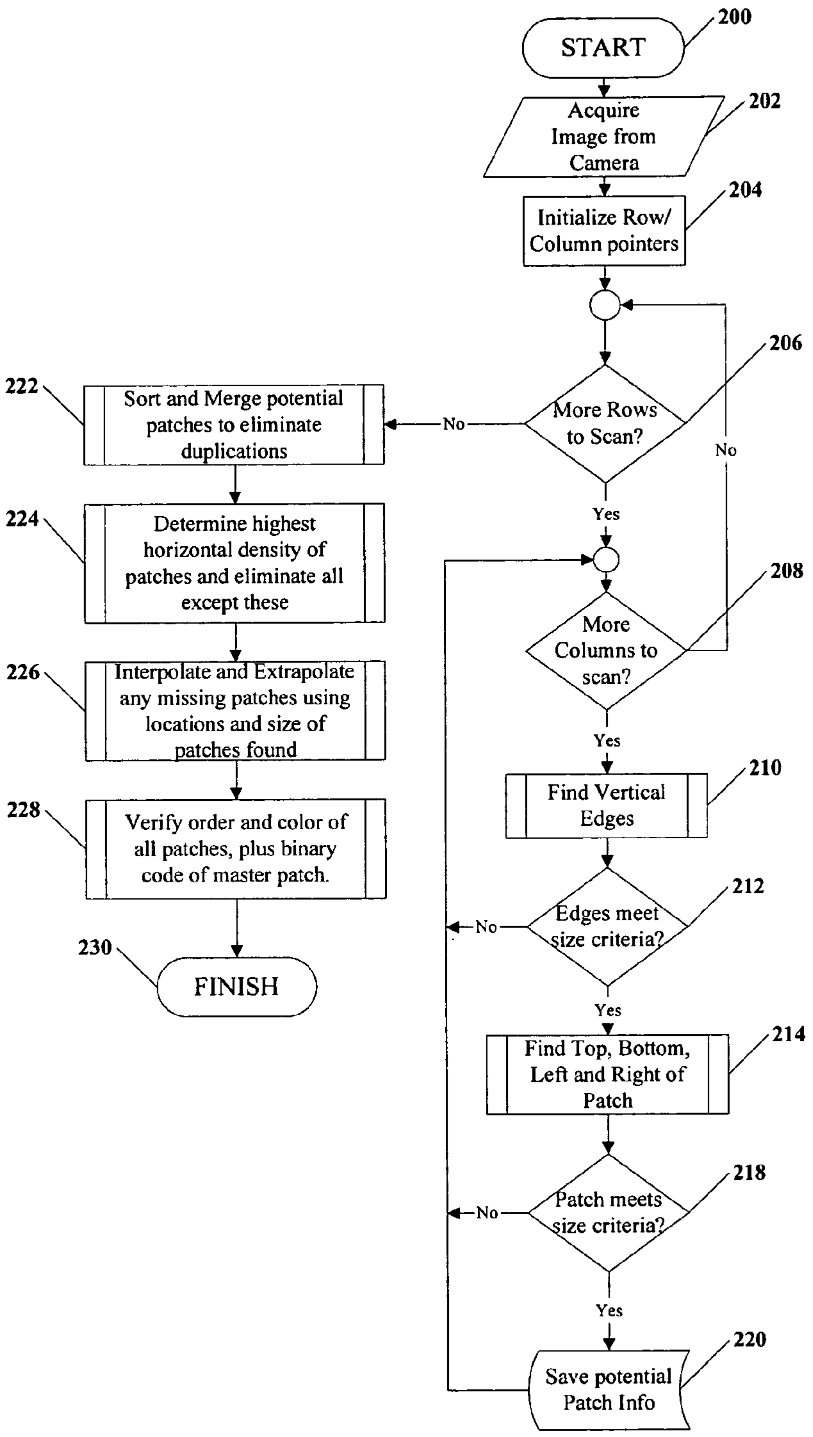
FIG. 2 is a flowchart showing an overview of a color bar recognition process using the inventive color control system.

FIG. 2 is a flowchart representing a recognition algorithm showing the steps for recognizing color bars and color patches. The recognition algorithm assumes the color bar runs horizontally along the width of the substrate. Each patch is the same size and shape as specified in advance. All of the patches for a given key fall into the field of view of the camera at one time, and no two adjacent patches are the same color. Typical size of a color patch is 2 mm along the Y axis and 3.5 mm along the X axis with a 0.5 mm space between adjacent patches.

Color patches in the color bar can be of the solid, n % screened (e.g. 25%, 50%, 75%), clear and one color trapped under another types. The solid patch is normally used for measuring solid ink density. A 50% screened patch is normally used for measuring dot gain. A 75% screened patch is normally used for measuring contrast. A clear patch is used for calculating the unprinted substrate color value. A trap patch is normally used to measure the trap value of one color printed over the other. A three color overprinted patch can be used to measure gray balance.

The patches on the color bar can be easily recognized in the acquired image by "edge detection" and "blob analysis" techniques that are well known in the image processing industry. Although the vertical location of the color bar (circumferential relative to the print cylinder) within the printed image is known in advance, differences in substrate tension, and the location of the imaging assembly relative to the position encoder require that a search be conducted to find and center the color bar. In normal operation, an area of ±four inches from the expected position is searched along the Y-axis (vertically) with the imaging assembly placed in the expected center of the page horizontally. On cue from the counter board, the strobes are triggered for an interval short enough to freeze the image from the passing substrate and long enough to properly saturate the imager with color information. This image is analyzed to determine if any patches are present and qualified in shape, size and quantity. If they are not, a new vertical position, approximately ⅓ of the field of view removed from the first, is computed and another image is taken. This continues through the scan range until a qualified color bar is found or until the operator aborts the search. Since substrate width can change from job to job, BCC also finds the physical end of the color bars to decide the range of key zones to be scanned for the job.

Color bars are printed on each image produced by the printing press in order to obtain representative samples of pure color from each print unit. This color bar pattern repeats along the X axis for each ink key in the print fountain. These samples are scanned by the camera and the resulting color values are used to determine the correct ink key settings. As discussed above, it is important for the computer to be able to quickly and accurately locate the position of each sample, or "patch", on the color bar from the image provided by the camera.

Once found, the color bar patches are examined for their color values and the imaging assembly is moved to center the master patch in the field of view. The difference between the actual X and Y location of these patches and the operator programmed location is calculated and used as offsets to align the imaging assembly to the printed information. A previously defined master color patch is identified and its position within the field of view is determined. The imaging assembly is moved horizontally, and the encoder counter board is reprogrammed, to position the master color patch in its correct position within the field of view. The remaining color bar patches are then examined for the correct order. If this final test is passed, the color bar is fully identified. The final position computed for the imaging assembly is then used as a reference for positioning it to image the color bar for any key or any random region of interest on the printed substrate.

The camera next scans the image one key width at a time in each direction horizontally until qualified color bars are no longer found. This is used to define the edges of the printed page, and therefore the area to be scanned for color control. For each color bar image acquired subsequently during the scanning process the imaging assembly's reference point is continually "fine tuned" to compensate for variations in the substrate's path through the press. This fine tuning process uses the master patch and color order in the same manner described above.

A special case for calibration is provided for both color bar mode and color barless mode, where the entire vertical range is searched, and the resulting position is used to establish a "zero reference" for a particular press configuration. Normally this is done when the system is installed, and the established zero reference is stored and used as the start point for all subsequent normal scans, thus speeding the search process considerably. This procedure may be repeated if the timing between the print cylinder and encoder are disturbed for any reason, such as for maintenance.

Images from the imaging assembly are digitized as "pixels", or points of light of various intensity and color. Each pixel is composed of a mix of three primary colors, red, green and blue. When mixed virtually any visible color may be produced. Each primary color has 256 possible intensities, therefore 16,777,216 possible distinct colors may exist. Because of variation in color register, ink pigments and lighting, plus various electronic distortions and noise, a color area will not always produce the exact same unique color value. The unique method of the invention described herein and including the computer program which is incorporated herein by reference, distinguishes colors to correctly identify each color area as unique to itself and yet different from the background image.

The pixels for each acquired image are arranged in the memory of the computer as repeating numerical values of red, green and blue in successive memory locations. The picture is made of X pixels wide by Y pixels high, and the numeric representation of the pixels repeats regularly through the computer memory thereby creating a representation of the visual image which may be processed mathematically. The exact memory location of any pixel is located by multiplying its Y coordinate by the number of pixels in each horizontal row and again by three, then adding its X coordinate multiplied by 3. For example, if the image is 640 pixels wide (X) and 480 pixels high (Y), and one needs to know the location (M) for the numerical value of the pixel located at 30 (Xv) by 20 (Yv), the formula would be:

$$M=(3X)(Yv)+3Xv,\ M=38{,}490 \text{ for red, } 38{,}491 \text{ for green, and } 38{,}492 \text{ for blue.}$$

Using this formulation each image of 640 by 480 pixels requires 921,600 numeric values for a complete representation. The color bar recognition algorithm uses this formula repeatedly to locate pixel values to compare and ultimately determine the X and Y coordinates of each patch in the color bar.

In the color bar mode, a sub area of the color patch is considered. The size of the sub area of the patch is determined by the parameters. The average RGB value of the pixels in the sub-area is considered in determining the color value of the patch. For example, for a patch size of 70 pixels×30 pixels, a sub area of 55 pixels×20 pixels in the center of the patch may be considered for determining the average color value of the patch. This prevents color errors from occurring due to camera artifacts and motion distortion.

Each patch in a key zone is identified for its color by considering an inspection area smaller than, and contained within, the color patch. Average of all the pixels in this area is calculated for red, green and blue channels. Color correction and conversion from rgb to cmyk is applied according to the following matrix equation:

$$Z = r + g + b$$

-continued $$\begin{bmatrix} c \\ m \\ y \end{bmatrix} = 255 - \begin{bmatrix} A_r & B_r & C_r \\ A_g & B_g & C_g \\ A_b & B_b & C_b \end{bmatrix} \cdot \begin{bmatrix} r^J \\ g^J \\ b^J \end{bmatrix} + \begin{bmatrix} D_r\left(\frac{r}{Z}\right) + E_r\left(\frac{g}{Z}\right) + F_r\left(\frac{b}{Z}\right) \\ D_g\left(\frac{r}{Z}\right) + E_g\left(\frac{g}{Z}\right) + F_g\left(\frac{b}{Z}\right) \\ D_b\left(\frac{r}{Z}\right) + E_b\left(\frac{g}{Z}\right) + F_b\left(\frac{b}{Z}\right) \end{bmatrix} +$$

$$\begin{bmatrix} G_r\left(\frac{r}{Z-r}\right) + H_r\left(\frac{g}{Z-g}\right) + I_r\left(\frac{b}{Z-b}\right) \\ G_g\left(\frac{r}{Z-r}\right) + H_g\left(\frac{g}{Z-g}\right) + I_g\left(\frac{b}{Z-b}\right) \\ G_b\left(\frac{r}{Z-r}\right) + H_b\left(\frac{g}{Z-g}\right) + I_b\left(\frac{b}{Z-b}\right) \end{bmatrix}$$

$$k = A_k(255 - r) + B_k(255 - g) + C_k(255 - b)$$

where c, m, y, and k (cyan, magenta, yellow and black/gray) represent the primary colors used in printed media, and r, g and b (red, green and blue) represent the primary colors used to represent images within computer media, and the remaining terms represent conversion constants.

Constants in the matrix equation are derived during the calibration process. These constants can change based on changes in color values of standard inks used in a process. Based on corrected r, g and b values for each patch, color values are determined based on a empirical data generated using industry standard logarithmic formulas to convert from transformed color values to color density values. These values are compared against target color values for that specific ink zone. If the difference between these two values is outside acceptable limits, i.e. if the difference between the actual color value and the pure color value for a color is not equal to the difference between the pure color value and the target color value, a new ink key position is calculated for the ink unit printing that color and the engine communicates this new position to the corresponding PUC.

The imaging assemblies also scan in both directions along the X axis, being moved by the linear drive. The imaging assemblies continue scanning the color bar until the press stops printing or the operator changes the mode of a surface from AUTO to MANUAL. In the color bar mode, the imaging assembly continuously monitors the position of the color bar and adjusts the Y axis position to keep color bar centered in the camera field of view. Any substrate movement along the X axis is also corrected by the engine by keeping track of master color patch location within the field of view. If an imaging assembly loses synchronization with the color bar for any reason, the color bar searching procedure is reinitiated.

If the job is configured for barless mode, the BCC apparatus loads a count corresponding to the locator mark location into the counter board and commands the counter board to start trigger pulses for image acquisition. Image analysis is preferably performed to identify the locator mark in the acquired image. If the locator mark is not found in the acquired image, the engine changes the count in the counter board to advance or retard the area of the printed image visible to the imaging assembly. The search distance along the Y axis is programmable with engine parameters. If the locator mark is still not found in the acquired image, the engine moves the imaging assembly along the X axis and the search is repeated. When a valid locator mark is found in an acquired image, its location is stored for use. This operation aligns imaging assembly to the ink zones. Based on locations determined during image file analysis from the pre-press software, BCC acquires images in each ink zone corresponding to each color. Image analysis is performed to determine the actual color values from the acquired images. The color value for each primary color in the corresponding image is determined based on color purity and color intensity. These values are compared against the target color values for the corresponding color in respective ink zones and a color difference value is calculated. If the difference between these two values is outside acceptable limits, i.e. if the difference between the actual color value and the pure color value for a color is not equal to the difference between the pure color value and the target color value, a new ink key position is calculated for the fountain printing that color and engine communicates this new position to the corresponding PUC. The imaging assemblies preferably scan in both directions along the X axis. The imaging assemblies preferably continue scanning colors in each ink zone until the press stops printing or the operator changes the mode of a surface from AUTO to MANUAL. In the barless color mode, the imaging assembly periodically confirms the position of the locator mark and adjusts X and Y location to keep color imaging assembly aligned to the printed substrate. The position of the locator mark is also reconfirmed after some of the events on the press that may disturb the position of the substrate laterally or circumferentially. If an imaging assembly loses synchronization with the locator mark, the locator mark searching procedure is reinitiated.

Further, it is observed on the printing press that there is a delay from the time a change in ink key position is initiated to the time the full effect of that change shows up on the substrate. Typical delays on an offset printing press can be 500 impressions, where one impression is equal to one rotation of the printing cylinder. In the preferred embodiment of the invention, when the engine makes a change in a specific ink key position, it will wait for this delay to expire, and then further wait until the measured color stabilizes before making further changes to that specific key.

Further, if the press speed drops below a specified speed, as defined by a parameter typically set during installation, the imaging assemblies stop scanning and they are parked to one of the extremes along X axis. If the engine is in AUTO mode, scanning and key movements will resume after the appropriate delays once the press speed is restored to normal.

When an imaging assembly is scanning a specific surface, the operator can preferably touch a VIEW key on the console touch screen to see the acquired image on the console monitor. In this mode, images are updated as the imaging assembly scans across the substrate along the X axis. The operator can preferably request an image of a specific key zone by touching the appropriate buttons on the touch screen. The operator can also request the image of a specific region of interest (ROI) specified by the operator as X and Y coordinates on the substrate. Any number of ROI areas may be specified during the job setup or during the run in AUTO mode. When a specific image is requested, following actions take place:

1. Sequential scanning of keys on the corresponding assembly is temporarily halted.
2. The corresponding imaging assembly is positioned to the X location of required image.
3. The encoder count number corresponding to the Y location of the required image is loaded in the counter board.
4. An image is acquired and stored in the engine for further processing.
5. The image is passed to the console and displayed on the screen.
6. Normal key scanning resumes where it left off.

At this point, the operator can touch anywhere on the displayed image. BCC then calculates the average density of all the pixels within the specified area and displays it on the screen. ROI dimensions can also be changed by changing motorized zoom and focus in the camera.

BCC is built with statistical quality monitoring (SQM) features. Color value data is stored at the end of each pass across the width of the substrate in various industry standard formats. This data is displayed on the screen, preferably in the form of a graph. This data is also preferably available on the Ethernet network and the customer can import this data directly into commercially available statistical quality control, database or other software of their choice.

Other maintenance functions are also preferably provided to save the current position of all keys on all ink fountains in the system, and open or close ink fountains to a predetermined value. When normal operation is resumed, the keys on these fountains would return to the last saved values.

Changing the encoder belt is a maintenance procedure which may disturb the encoder timing in relation to the print cylinder. BCC has an encoder teach mode feature. When this feature is activated for a specific surface, BCC searches for the color bar or a locator mark within the entire possible Y axis. When a color bar or a locator mark is found, the offset from encoder index pulse is calculated and saved.

Due to the aforementioned disadvantages of color bars, if a color bar is necessary, it is desirable to have the smallest possible color bars. During the start of the printing process, two factors affect the print quality the most—register and color. It is also well known that most automatic register control systems cannot identify register marks unless the color for the marks is correct and the print is clear. One preferred automatic register control system that can properly identify such register marks described in U.S. Pat. No. 6,621,585, which is incorporated herein by reference. Most color controls have problems recognizing color bars due to register error between colors. Automatic register control and color control work sequentially instead of working in parallel. In such cases, performance of one affects the performance of the other. The overall effect of this interdependence is increased waste.

The color register control of the previously referenced invention is based on shape recognition, so it is very tolerant to the print quality and color of the printed register marks. A color bar recognition algorithm is provided that is very tolerant to color register error. Operating in the barless mode, BCC does not need a color bar. The combination of these technologies provides the best performance since both controls work in parallel.

For the barless mode, the same logic is applied to identify the locator mark. The size, shape and color of the locator mark are defined by parameters in BCC. The known position coordinates of the locator mark are defined by the press operator during job setup. The BCC imaging assembly starts scanning the printed substrate in the area corresponding to the location set by the operator. If the locator mark is not found at the starting location, BCC searches in an area of approximately ±four inches from the expected position along both X and Y axes. Once found, the difference between the actual and expected position of the locator mark is used as an offset to maintain the correct relation between ink zones on the substrate and the ink keys on the press.

For barless operation a single locator mark is used. It may be printed anywhere on the substrate and is identified by its size, shape, color and binary code. The binary code is as described above for the color bar master patch. Once the location of the barless locator mark is known on the substrate, and once the relation between barless locator mark and the key zones is also known, the position of the barless locator mark is used to align the imaging assembly to the key zone for getting color information from the correct area.

In summary, if a color bar is not present, the job must run in barless mode, and the barless mode has only one locator mark. All ink zone locations are thereby calculated from the locator mark. If a color bar is present, the job may be run in two modes: 1) If job is still run in a barless mode, a separate locator mark may be provided or one of the patches from the color bar may be selected as the locator mark; all ink zones locations are calculated from the locator mark; or 2) If the job is run in color bar mode, each ink zone has one or more patches one of which is a master patch; and positioning of the imaging assembly is adjusted for each ink zone, based on the position of the master patch.

Determining color value in the barless mode is very different compared to the method in color bar mode. In color bar mode, the location, size and general color of the patches is known. Also, the color patches are printed with a single color ink. This makes it easier to decide the location of the area representing color value.

In the barless color mode, there are no dedicated color patches printed on the substrate. Thus, the color information has to be extracted directly from the printed image, which differs from job to job. Although for this discussion it is assumed that the job is printed with four primary process colors (cyan, magenta, yellow and black), the same logic can also be applied to a mixed color of known color values. The color value determination in an acquired frame image is achieved by performing several steps which are summarized in FIGS. 12 and 13.

As explained previously, the image available from pre-press is analyzed during job setup. Typical information available from pre-press in CIP3 format is arranged in layers of different color separations, each layer representing one printed color. A combination of all color separation layers makes the complete image being printed on the press. Each color separation layer is divided into ink zones that are aligned with the ink keys on the printing press, such that the width of the ink zone is equal to the width of ink key and the length of each ink zone is equal to the circumference of the printing cylinder.

The size of the image acquired by imaging assembly is typically 2.00" wide×1.50" high. An image aperture with a size smaller than the acquired image is specified using parameters. The typical image aperture size is 1.50" wide×0.75" high. The aperture width reflects the actual width of the ink key. The image aperture area is located centrally to the acquired image. Only the pixels contained within the image aperture area are analyzed for determining color value.

The key zones are analyzed one layer at a time to determine the Y axis offset where the maximum area of color best matching the pure primary color exists. Color matches are determined mathematically using the color sphere of FIG. 14 on small sub groups of pixels within the aperture. The resulting target color value coordinate within the color space is compared geometrically to the color coordinates of the pure color value for the primary reference color, as described above. The aperture which contains the largest number of pixel clusters with the smallest color difference is chosen for color analysis, i.e. the maximum pixel population area.

A parameter set during pre-press preferably also specifies a minimum amount of color coverage that would be acceptable for obtaining useable color information. For example, a parameter is set to specify the absolute amount of color required to perform a meaningful color analysis. While the system searches for the area in an ink zone having the highest pixel population matching the pure color, it also checks to make sure that the chosen area contains at least enough pixels to complete the process correctly. If no area is found in the ink zone that qualifies for the minimum coverage, the method determines the maximum amount of coverage for the color ignoring the FACT analysis.

All color scanning locations for all key zones and all printed colors thus determined are saved in the job file as a matched set comprising the key zone number, Y axis location and associated color. During the scanning procedure, the imaging assembly acquires its image of the pre-determined location from the matched data set stored in the job file. As used herein, the term "job file" is used to describe a memory.

Next the FACT image analysis is performed according to the following steps. First, gray pixels are separated from tinted pixels within the image aperture. Gray pixels run the range from pure black through pure white and occur where approximately equal amounts of ink are overlapping on the substrate or where too little ink is printed to contribute useful color information. Also, by eliminating these pixels we reduce the number of pixels to process which reduces overall computation time. In the special case of analyzing black ink, the process is reversed and the grays are analyzed and the tints discarded.

Each remaining pixel is then assigned a color coordinate, i.e. color value, within the color space using the color sphere, i.e. the 3-dimensional color sphere of FIG. 14. These color coordinates are compared to the color coordinates of the reference pure ink color values and the pixels are then sorted by similarity. Since this set is typically 50,000 to 100,000 pixels the sorting process can take a prohibitive amount of time. Instead of a direct sort we use a simplified filtering technique which quickly eliminates unusable pixels by an iterative process of grouping and averaging. We continue the process until we are left with the number of samples required to obtain a usable color average value. We then use this value to determine the equivalent color value using the same transforms and lookup table used in the color bar mode.

In the case of black ink we only use the Z coordinate of the color space to determine similarity. This is to eliminate confusion between grays created by mixing other primary colors and to provide the darkest possible sample.

The procedure for converting the camera's rgb color values to the FACT color space is a multi step process:

Where r, g and b are the camera generated color values; and x, y and z are the FACT color space coordinates; and given that A, B, C, D, E, F, G, H, I, J, K, L, and M are constants determined during the calibration process.

Then:

$$\begin{bmatrix} r_1 \\ g_1 \\ b_1 \end{bmatrix} = \begin{bmatrix} r \\ g \\ b \end{bmatrix} \cdot \begin{bmatrix} A_r & B_r & C_r \\ A_g & B_g & C_g \\ A_b & B_b & C_b \end{bmatrix} + \begin{bmatrix} D_r\left(\frac{rg}{r+g}\right) + E_r\left(\frac{gb}{g+b}\right) + F_r\left(\frac{br}{b+r}\right) \\ D_g\left(\frac{rg}{r+g}\right) + E_g\left(\frac{gb}{g+b}\right) + F_g\left(\frac{br}{b+r}\right) \\ D_b\left(\frac{rg}{r+g}\right) + E_b\left(\frac{gb}{g+b}\right) + F_b\left(\frac{br}{b+r}\right) \end{bmatrix}$$

$$\begin{bmatrix} r_2 \\ g_2 \\ b_2 \end{bmatrix} = \begin{bmatrix} G_r + H_r(r_1)^{I_r} \\ G_g + H_g(g_1)^{I_g} \\ g_b + H_b(b_1)^{I_b} \end{bmatrix}$$

-continued $$\begin{bmatrix} r_3 \\ g_3 \\ b_3 \end{bmatrix} = \begin{bmatrix} 100\left(\frac{r_2 + 0.055}{1.055}\right)^{2.4} \\ 100\left(\frac{g_2 + 0.055}{1.055}\right)^{2.4} \\ 100\left(\frac{b_2 + 0.055}{1.055}\right)^{2.4} \end{bmatrix}$$

$$\begin{bmatrix} r_4 \\ g_4 \\ b_4 \end{bmatrix} = \begin{bmatrix} \left(\frac{r_3 J_r + g_3 K_r + b_3 L_r}{M_r}\right) \\ \left(\frac{r_3 J_g + g_3 K_g + b_3 L_g}{M_g}\right) \\ \left(\frac{r_3 J_b + g_3 K_b + b_3 L_b}{M_b}\right) \end{bmatrix}$$

$$\begin{bmatrix} x \\ y \\ z \end{bmatrix} = \begin{bmatrix} 500(r_4 - g_4) \\ 200(g_4 - b_4) \\ 116g_4 - 16 \end{bmatrix}$$

For CIP3 cmyk separations one additional step is added at the beginning of the process:

Where c, m, y and k are the CIP3 ink coverage values for Cyan, Magenta, Yellow and Black color respectively; and r, g and b are the corrected camera equivalent color values; and A through R are constants determined during calibration.

Then:

$$\begin{bmatrix} R_r \\ R_g \\ R_b \end{bmatrix} = \begin{bmatrix} \left(\frac{A_r(c^3) + B_r(c^2) + C_r(c) + D_r}{E_r}\right) \\ \left(\frac{A_g(m^3) + B_g(m^2) + C_g(m) + D_g}{E_g}\right) \\ \left(\frac{A_b(y^3) + B_b(y^2) + C_b(y) + D_b}{E_b}\right) \end{bmatrix}$$

$$\begin{bmatrix} G_r \\ G_g \\ G_b \end{bmatrix} = \begin{bmatrix} \left(\frac{F_r(c^3) + G_r(c^2) + H_r(c) + I_r}{J_r}\right) \\ \left(\frac{F_g(m^3) + G_g(m^2) + H_g(m) + I_g}{J_g}\right) \\ \left(\frac{F_b(y^3) + G_b(y^2) + H_b(y) + I_b}{J_b}\right) \end{bmatrix}$$

$$\begin{bmatrix} B_r \\ B_g \\ B_b \end{bmatrix} = \begin{bmatrix} \left(\frac{K_r(c^3) + L_r(c^2) + M_r(c) + N_r}{O_r}\right) \\ \left(\frac{K_g(m^3) + L_g(m^2) + M_g(m) + N_g}{O_g}\right) \\ \left(\frac{K_b(y^3) + L_b(y^2) + M_b(y) + N_b}{O_b}\right) \end{bmatrix}$$

$$\begin{bmatrix} r \\ g \\ b \end{bmatrix} = \begin{bmatrix} (R_r G_r B_r) + P \\ (R_g G_g B_g) + Q \\ (R_b G_b B_b) + R \end{bmatrix}$$

These color values are calculated for each color in each key zone path as the BCC imaging assembly continuously scans the substrate to determine actual color values. At the end of each pass, the color values are updated and the differences between the target and actual color values are calculated.

Based on these differences, ink keys in corresponding zones are opened or closed to maintain constant color.

The invention can be further understood through FIGS. 1-14 of the invention which are described in detail as follows:

Looking to the figures, FIG. 1 provides a system overview of the invention. The system preferably comprises an engine 100. The preferred engine functions include communications 102, press control 104 and image analysis 106. The communications 102 function takes care of the communications between the engine and all peripherals attached to the engine. The press control 104 function provides control signals for moving the ink adjusting mechanism on the press. The image analysis 106 function analyses the image acquired from the imaging assembly 116. Three modes of communication are provided for the engine to communicate with various peripherals attached to the engine. An industry standard Ethernet backbone network 128 is provided to communicate with a pre-press server 130, a system management and statistical reporting workstation 132, printers 134 and single or multiple user consoles 136, 138. An industry standard IEEE 1394 bus 124 is provided to communicate with one or more digital color cameras 122, to pass instructions to the camera(s) and also to acquire image information from the camera(s).

One imaging assembly 116 is provided for each surface of substrate. An imaging assembly comprises a positioning motor 118, 620, see also FIG. 6, for positioning the assembly across substrate 650. Each imaging assembly also comprises a digital color camera 122 and a strobe assembly 120. The strobe illuminates the field of view for a very short period of time and the image is acquired by the camera. Strobe illumination is synchronized with the position of camera in relation to the substrate by an input trigger signal from an encoder and counter board 126. The same trigger signal is also transmitted to the camera to synchronize image acquisition with strobe illumination. One encoder 126 per substrate is provided to get the position information for timing the image acquisition with the printed substrate.

The network backbone 140 provides communication between the engine and one or more print unit controllers 108 and also between the engine and the imaging assembly 116. One Print Unit controller 108 is preferably provided per printing unit on the printing press. The print unit controller 108 preferably provides functions for key control 110, ink stroke control 112, and water control 114, and one print unit controller may control one or more sets of ink fountain, ink stroke control and water control. Depending on the printing process and printing press design, ink stroke control 112 and water control 114 may or may not be built into the system. Since print unit controller architecture changes between different presses and press manufacturers, the communications between the engine and the PUC may be performed using other industry standard backbones like, Ethernet, Arcnet, Profibus, RS232, RS485, etc., as required.

FIG. 2 gives details about color bar recognition process 200. When BCC is used in a “color bar mode”, this process is used to identify color bar and color patches corresponding to each key zone on the substrate. The process is also used when the operator programs BCC system for a “color bar mode” and when BCC gets press interface signals to start the process. An image is acquired 202 according to the process explained in FIG. 11. The image information thus acquired is transmitted to the BCC computer. This stored image is digitized as pixels.

The image thus acquired is further analyzed for each row 206 and each column 208. Areas of a single color are marked as possible patch locations. For each possible location of a color patch, the top and bottom vertical edges are found 210. If the distance between the top and the bottom edge meets the patch size criteria 212, then precise top, bottom, left and right edges for the patch are found 214. From this information, precise size of the patch is determined. Edge detection algorithms are well known in the image processing industry. If this size meets the patch size criteria 218, this can be a potential patch along the color bar and its location and color information is stored for future use 220. This process is repeated to find all potential patches in the acquired image.

When all potential patches are identified in the image, first they are sorted and merged to eliminate duplicate potential patches 222. Then, the highest concentration of patches along the X direction are found from these patches and all others are rejected 224. Based on the location and size of these patches, any missing patches are interpolated and extrapolated 226. Next, the binary code of the master patch is identified and compared with the location corresponding to this key zone 228. Also, the color of each patch is identified and compared with the color order configuration set by the press operator during job defining process. At the end of this process 230, the information in the acquired image for each color patch along the color bar is available for further color analysis.

Figure 3:
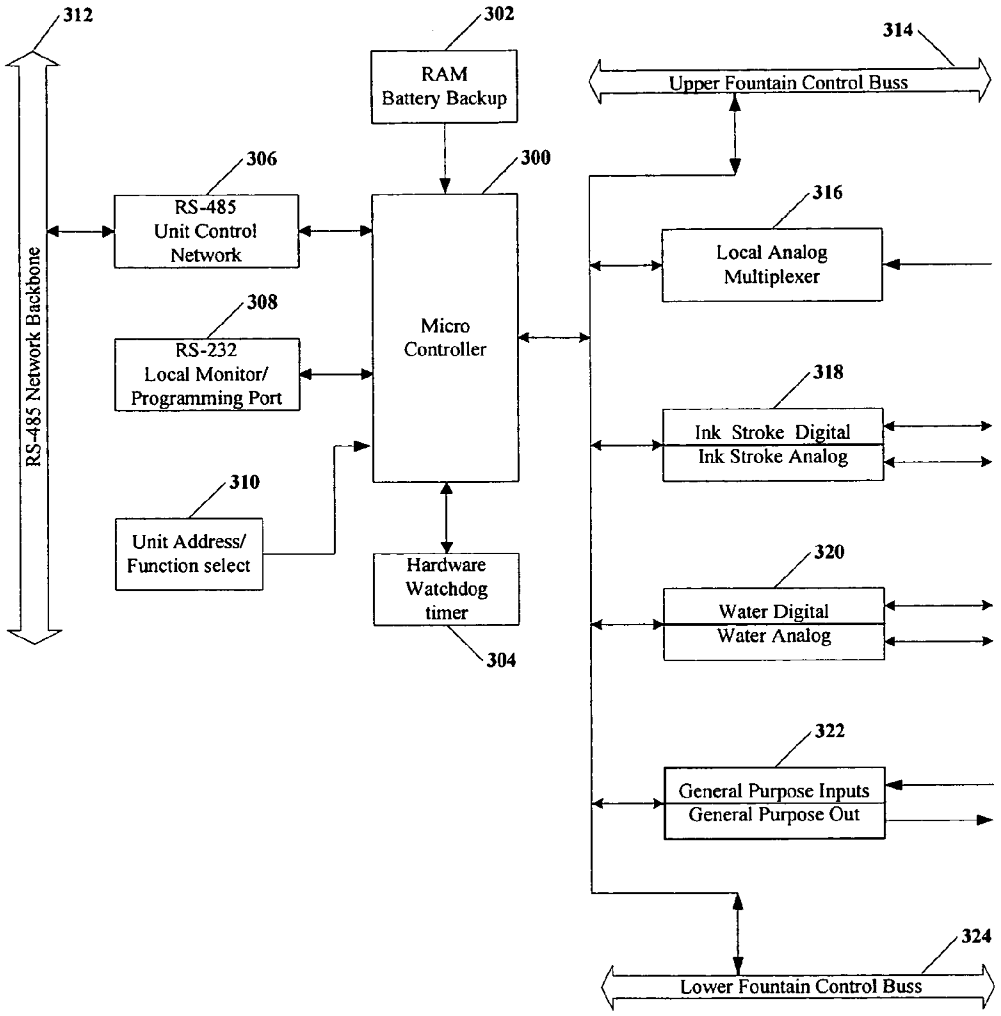
FIG. 3 is a block diagram of a print unit controller for the inventive color control system.

FIG. 3 gives further details about a print unit controller 108. It comprises a micro controller 300 for logic control. A RAM battery backup 302 is provided to save memory value in case of power loss. A hardware watchdog timer 304 is provided to continuously monitor for reliable operation of print unit controller operation. RS-485 unit control network 306 hardware is provided to communicate with a RS-485 network backbone 312, 140. Additional hardware is provided for an RS-232 local monitoring and programming port 308. Unit address and function select 310 hardware is provided to individually address each print unit controller. Each print unit controller can control two ink fountains on a printing press. Upper fountain control buss 314 and lower fountain control buss 324 are connected to the micro controller 300. The micro controller is also attached to ink stroke 318 and water 320 Input/Output hardware equipped for either analog or digital signal input/output interfacing. General purpose inputs and outputs 322 are provided for interfacing with various other events and functions on a printing press. A local analog multiplexer 316 is provided for reading analog signals from various inputs on the processor board.

Figure 4:
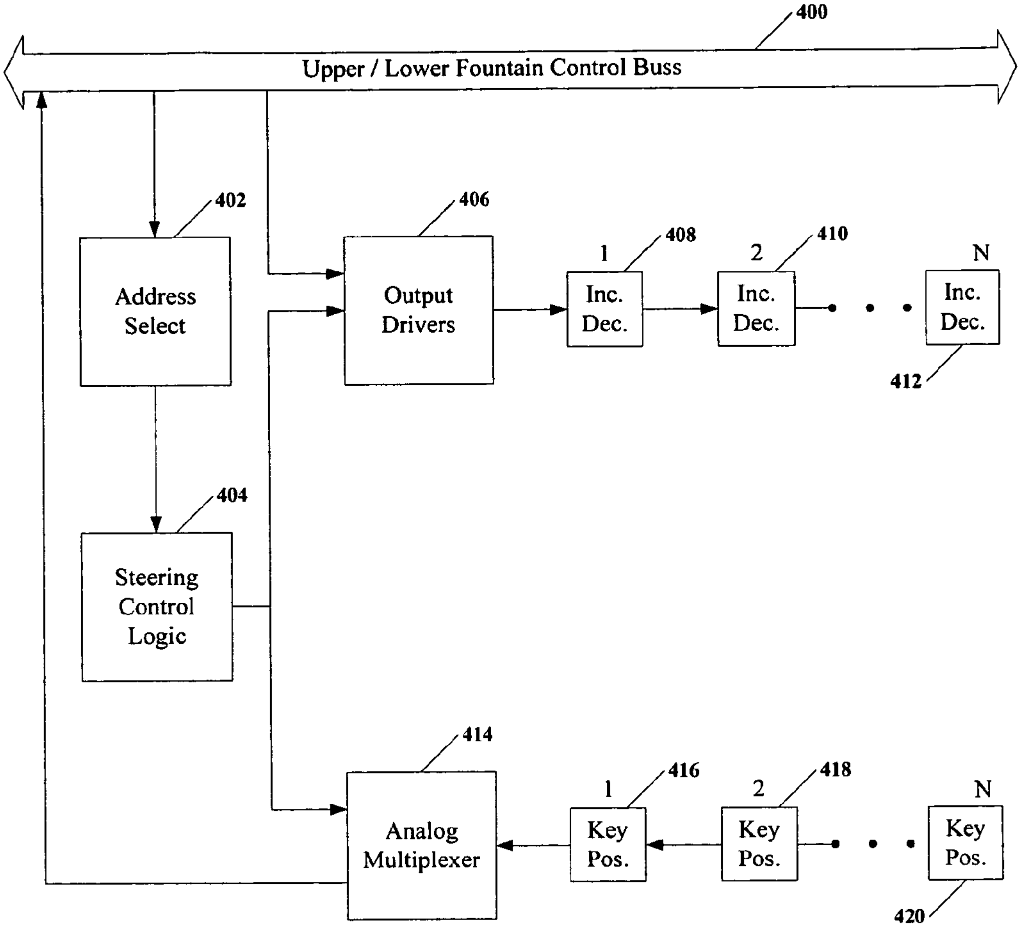
FIG. 4 is a block diagram of a upper/lower fountain control buss operation for a fountain key adapter for the inventive barless color control system.

FIG. 4 gives further details about upper/lower fountain control buss 314, 400 operation for a fountain key adapter. Each fountain key adapter can adjust the position of a plurality of ink key actuators and it can also read the position for the corresponding ink keys. An address select 402 switch is provided to cascade fountain key adapters to provide control for a plurality of ink keys. Steering control logic 404 selects operation on the top or the bottom fountain. Output drivers 406 switches ink key actuators 408, 410, 412 power to open or close the ink key. Analog multiplexer 414 reads the ink key 416, 418, 420 positions.

Figure 5:
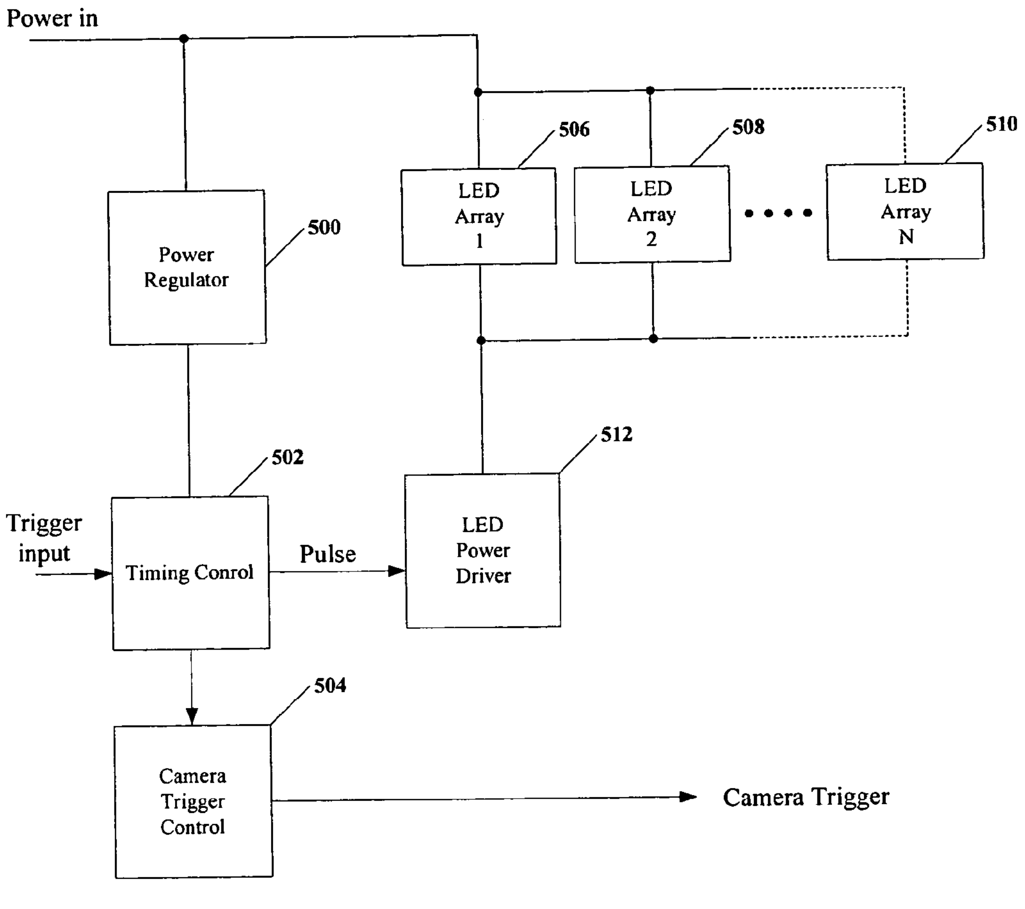
FIG. 5 is a block diagram of strobe and camera control functions.

FIG. 5 provides details about strobe operations. Power is supplied to the strobe assembly through a power regulator 500. A trigger input to the circuit is used to synchronize strobe illumination with image acquisition. The strobe illuminates for a fixed time synchronous to the trigger input pulse. Timing control 502 provides the logic for timing between trigger input and illumination. One or more LED arrays 506, 508, 510 can be attached to the LED power driver assembly 512. Each LED array can have one or more LEDs for illumination. Timing control 502 also interfaces with camera trigger control 504. Camera trigger control processes the timing signal from timing control and provides a camera trigger signal appropriate for triggering the camera for image acquisition.

Figure 6B:
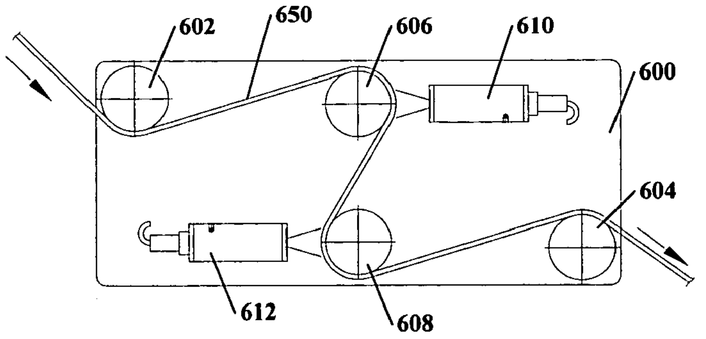

FIG. 6A illustrates the apparatus for systematically scanning the image from the substrate 650. It is composed of two frames 600. A web lead-in roller 602 is provided to accept the substrate 650 from previous process equipment. A web lead-out roller 604 is provided to deliver the substrate to the next process equipment on the printing line. Between lead-in and lead-out rollers, the substrate travels over two rollers 606, 608. The imaging assembly comprising a color camera and a strobe light 610 scans the top side of the substrate passing over the roller 606. The imaging assembly comprises a color camera and a strobe light 612 scans the bottom side of the substrate passing under roller 608. Both imaging assemblies 610, 612 are mounted on a carriage 614, which moves and positions the imaging assembly to operator specified locations across the substrate width. The carriage 614 is equipped with v-groove guide wheels and the guide wheels keep the camera on the guide 616. The carriage is also equipped with a linear drive in the form of motor 620 and a timing belt pulley installed on the shaft of the motor. A timing belt 618 is provided across the width of the carriage guide. Rotation of the motor 620 on the belt moves the carriage 614, motor 620 and imaging assembly 612, 614 across the substrate. The carriage guide is mounted on the mounting brackets 622, which are subsequently mounted on the frames 600. FIG. 6B presents a side view of the equipment described above.

FIG. 7 provides details about the color bar configuration. The color bar consists of color patches arranged in a row along the X direction of the substrate, from one end to the other end. The space on the color bar corresponding to each key zone can have up to 8 color patches. Each patch can be printed with a solid color, a % tint of a color, a white space or an overprint of one color on top of the other color. More patches can be accommodated if the patches are made smaller or if the patches are stacked in multiple rows. In order to assure correct alignment of the imaging assembly to the printed substrate, the color bar area in each key zone includes a centrally located master patch. The group of colorbars traversing all of the ink zones across the substrate is frequently referred to simply as "the color bar".

Figure 8A:
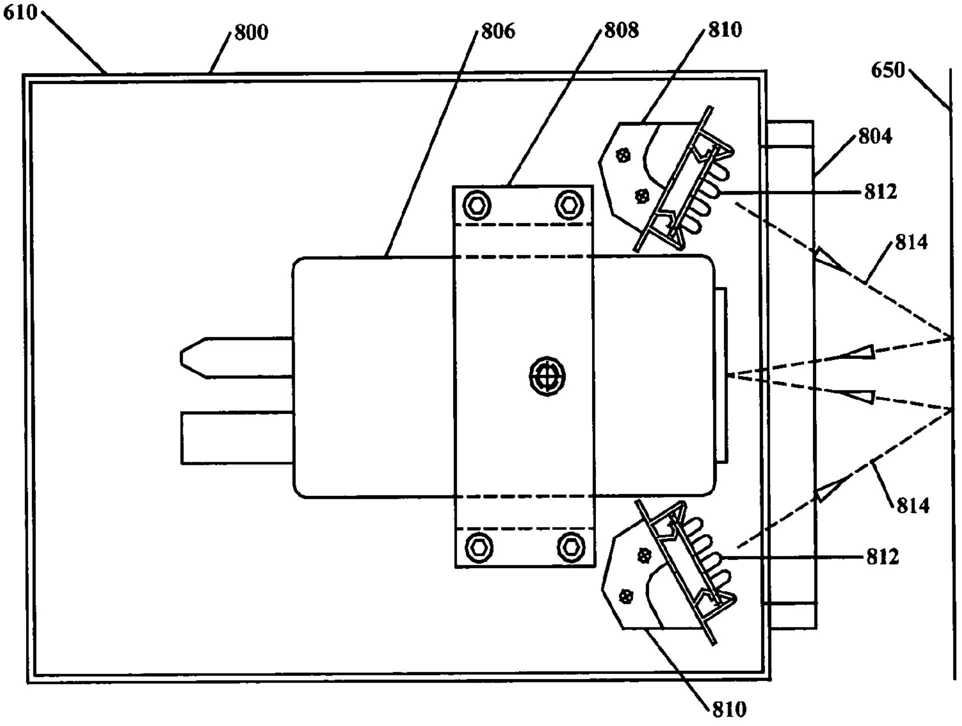
FIG. 8A is side perspective view of an imaging assembly according to the invention.
Figure 8B:
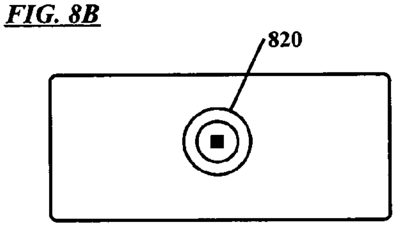
FIG. 8B and FIG. 8C show single and multiple light source strobes respectively.
Figure 8C:
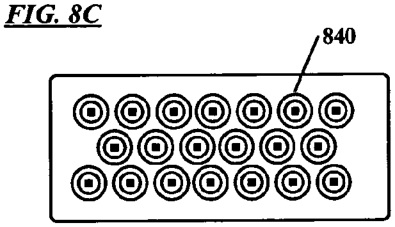

FIG. 8A is side perspective view of an imaging assembly 610 according to the invention, which is the same as imaging assembly 612 as shown in FIGS. 6A and 6B. It comprises color digital camera 806 and two strobes 812 enclosed in an enclosure 800. The camera 806 is mounted inside enclosure 800 by mounting brackets 808 and the strobes are mounted inside enclosure 800 by mounting brackets 810. The enclosure has a clear window with a non-reflective coating 804 in front of the camera lens. The strobes illuminate the substrate 650. Light rays 814 from both strobes originate at the strobe LEDs and reflect back from the substrate and enter the camera lens. Each strobe may have a single light source, 820 as shown in FIG. 8B or an array of light sources 840 as shown in FIG. 8C.

Figure 9:
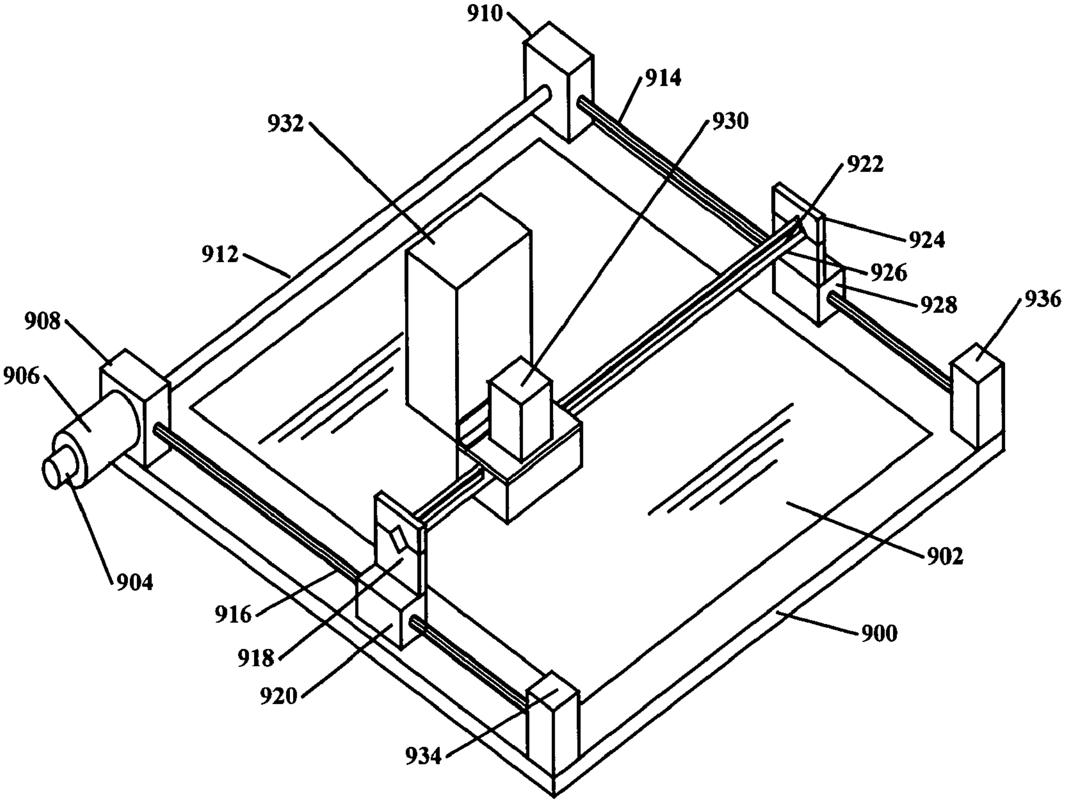
FIG. 9 illustrates an arrangement with a stationary substrate and a moving imaging assembly.

FIG. 9 describes an arrangement where the substrate is stationary and the imaging assembly 932 is mounted on a carriage with positioning motor 930. In this embodiment, the linear drive comprises two portions, one which moves the imaging assembly in the X axis direction and one which moves the imaging assembly in the Y axis direction in relation to the plane of substrate 902. The carriage moves on a rail 926 across the width of substrate 902, also known as the X axis. A fixed timing belt 922 is anchored to the supports 924, 918. A rail is also supported on two ends with supports 924, 918. Supports 918, 924 are mounted on brackets 920, 928 with nuts. The whole subassembly travels along the Y axis on two screws 914, 916. Both screws are supported on one end with brackets 934, 936. The other end of both screws is driven by bevel gear assemblies 908, 910. Bevel gear assemblies 908, 910 are coupled together with a shaft 912. Both bevel gear assemblies are driven by a positioning motor 906. An encoder 904 is attached to the motor shaft to give feedback for the Y axis position of the imaging assembly. The whole assembly is mounted on a base 900 which also serves as a support for substrate 902. In this arrangement, the substrate is held stationary and imaging assembly moves in both the X and Y orthogonal directions in relation to the plane of substrate 902.

FIG. 10 illustrates the typical nature and layout of print and ink zones on the substrate. An image is repeatedly printed on the substrate 1014, where the print repeat length 1006, 1012 is equal to the circumference of the printing cylinder. This direction is generally known as circumferential direction or a Y direction. The width of the printed substrate 1004, 1010 is generally known as lateral direction or X direction. In a typical printing press, an ink fountain provides the ink for printing operation. The ink fountain has several ink keys across the width of the fountain. Each ink key can be individually opened or closed to allow more or less ink in the corresponding longitudinal path of the substrate, called an ink zone 1008. Ink, from the ink fountain, travels along the ink train through distributor rollers. Any change in the ink key setting affects the whole longitudinal path, or ink zone, aligned with the key. A typical printing press also has oscillator rollers. In addition to the rotational motion, these oscillator rollers also have lateral motion moving back and forth. The axial motion spreads ink along the ink zone to the adjacent ink zones. The height and width of the acquired image 1000 is shown in the figure. Although the typical width of the image is 640 pixels and the height is 480 pixels, a different camera resolution can also be used for the application. Due to distortion and uneven lighting along the edges of the acquired image, a sub area of the image 1002 is used for the color analysis. This area is also called the image aperture.

FIG. 11 gives details about the image acquisition process in BCC, 1100, for getting color information for each key zone. This is a general process and it is used to acquire an image of the substrate in "color bar mode" as well as in the "barless mode". The process starts by positioning the imaging assembly at a desired location along the X direction, 1102. This is done by providing commands to the positioning motor and an integrated controller that keeps tracks of the imaging assembly position along the X direction. The location of the first image in Y direction is specified by calculating the encoder value of the first location and setting that value into the Counter Board 1104 preset. Now, the camera is armed 1106 to acquire the image when it receives the next trigger signal. Hardware in the counter board keeps track of the encoder shaft location, which is attached to a print cylinder. Thus the encoder shaft location provides precise timing information about the printed substrate location in Y direction. When the encoder count in the counter board matches with the preset count, the counter board generates a trigger signal 1108. The trigger signal is processed by the strobe board and it illuminates the LED array for a very short time 1110. This processed signal is also used to start image acquisition on the color camera 1112. The image acquired by the camera is transmitted to the BCC computer and it is stored for further analysis 1114. If the system is operating in "barless mode" 1116, additional images are acquired 1120 to get color information for each printed color. If the system is operating in "color bar mode", then the process is finished for this ink zone 1118 and the imaging assembly may proceed further to get information about the next ink zone.

Figure 12:
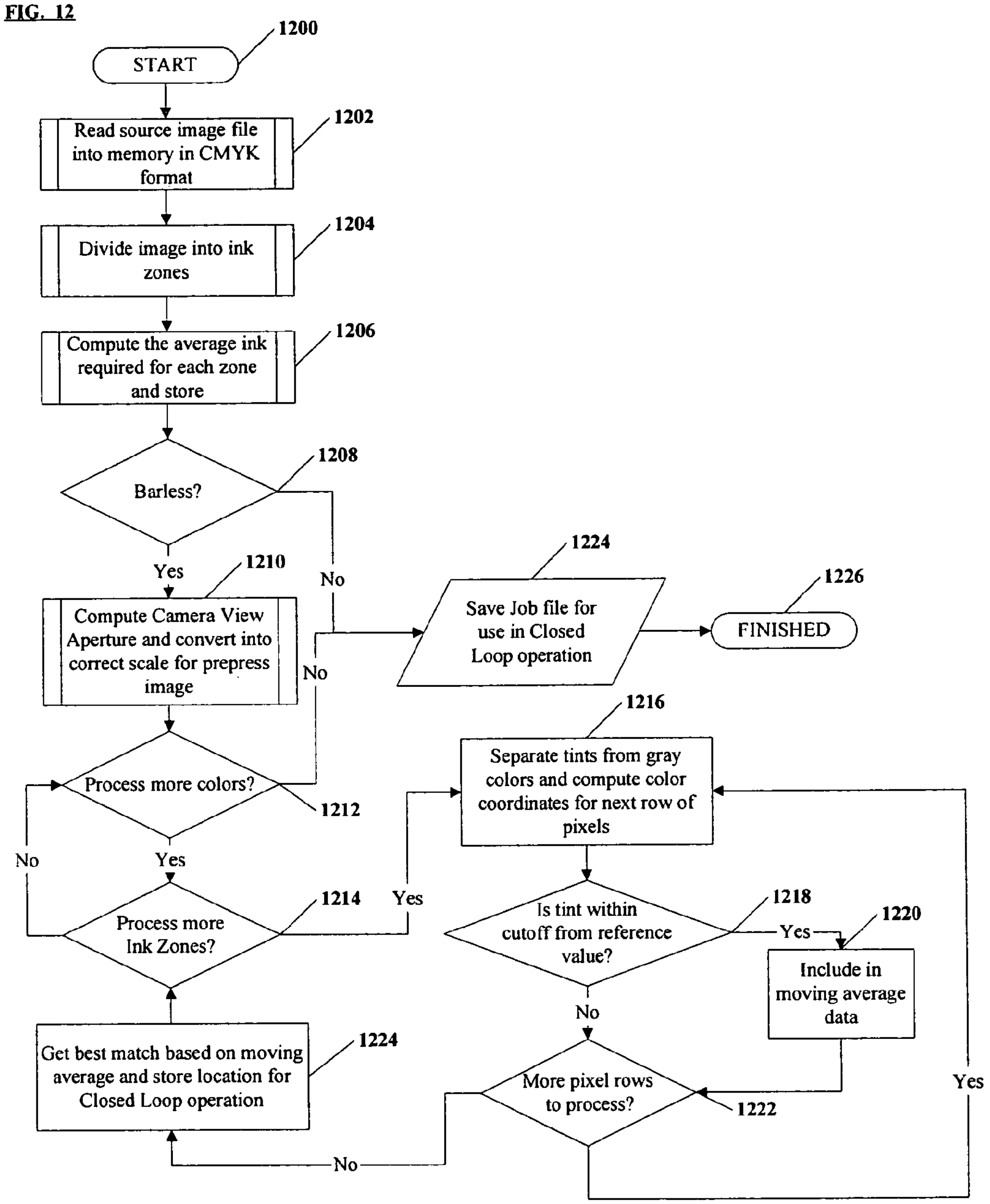
FIG. 12 is a flowchart illustrating the prepress color separation analysis process according to the invention.

FIG. 12 provides details about the pre-press color separation analysis process 1200. First, the source image file is read in cmyk format 1202. An image in this format is typically stored by the pre-press software with each primary color of ink assigned to a layer of the image. These layers are known in the industry as "color separations". This image is divided into zones corresponding to the ink zones 1204. Next, the average quantity of ink per color in each ink zone is calculated and stored in the job file 1206. If this job is set for "color bar mode" 1208, the job file is stored 1224 and the process ends. If the job is set for "barless mode", the camera view aperture is read from the configuration and a corresponding scale is calculated to analyze the pre-press image 1210. This analysis is performed for each color in the color separation layers 1212. For each color in the color separation layers, each key zone is analyzed 1214. For this analysis, the color tints are separated from the gray colors and color space coordinates are calculated 1216. Gray color is only used for calculating color values for the black color. A reference color coordinate for each separation is stored in a parameter file and used to represent that separation's pure (unmixed) color. If the difference between the printed tint color coordinate and the reference color coordinate is within acceptable range 1218, the value is stored to consider it in the moving average 1220. The moving average of the color coordinate differences are calculated for the whole key zone and the best location for the color analysis is selected based on largest grouping of closely matched pixels 1224. After this analysis, at least one location for each color on each key zone is available to get the best color information. Where there is not enough of a color being printed for acceptable measurement, that key zone and color will be marked and ignored during closed loop processing.

Figure 13:
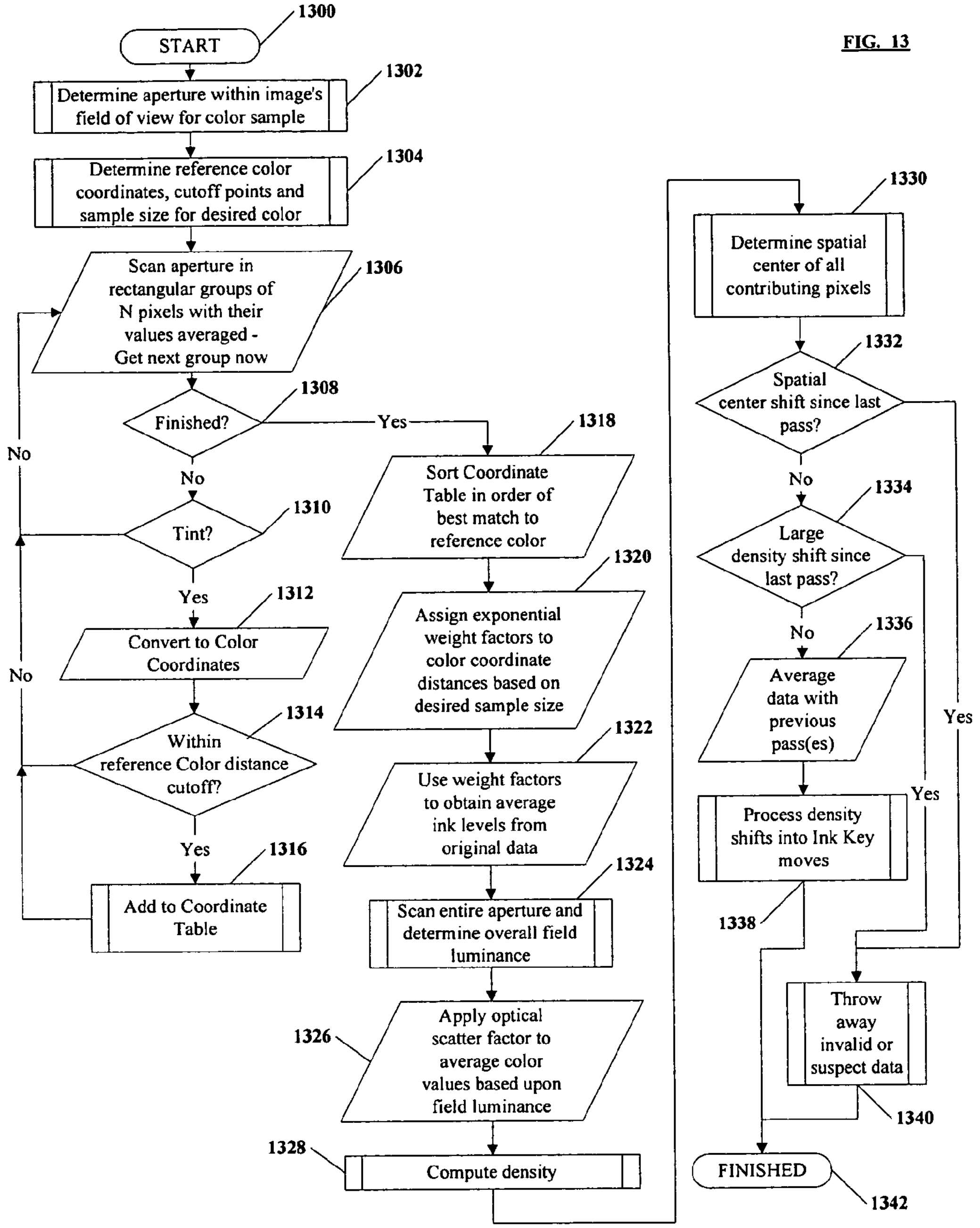
FIG. 13 is a flowchart illustrating the pixel quantifying process in barless color analysis according to the invention.

FIG. 13 provides details about the pixel quantifying process in barless color analysis. First, the image aperture is determined 1302, 1002 in the acquired image. The reference color coordinates, cutoff points and the sample size parameters for the desired colors are now read from the parameter file 1304. Next, the pixel values in the image aperture are scanned. The average of (M×N) adjacent pixels is calculated to reduce the data 1306. Typical values of M and N is 3 pixels. This is also done to filter out individual pixel distortion and consider only average color in the area. Each average of pixel values is now analyzed to determine if it is a color tint or a gray color 1310. The gray color values are used for analyzing black color while the color tint is used for analyzing other colors. The color tint values are converted to color coordinates 1312. Now the difference between this color coordinate and the reference color coordinate is calculated to determine if the average pixel value is within reference color distance cutoff point 1314. If the color value lies within the distance cutoff, the color coordinate value is added to the coordinate table 1316. This process is repeated for all the pixel groups in the image aperture area. When all the pixels in the image aperture area are analyzed 1308, the resulting coordinate table is sorted to best match the reference color 1318. Now the average value of the color coordinates are calculated with a weighted average 1322. An exponential weighting is used 1320 to provide more weight to the pixel coordinates with a closer match to the reference color and the weighted average for all colors is calculated. Next, the whole image aperture luminance value is calculated 1324 and an optical scatter correction factor is applied to the average color values 1326. In the preferred embodiment of the invention, an optical scatter computation and correction is conducted for both barless and color bar readings. These color values are now used to compute the density of each color 1328.

A spatial center of all color contributing pixels is calculated 1330. If the difference between the current and the last spatial center for this image location and color is more than a value specified by a parameter 1332, the current values are thrown away 1340. This result is also thrown away if the difference between the current density value and the last density value is more than a value specified by a parameter 1334. If current result passes these tests, they are added to the previous pass results to calculate average density values 1336. These values are used to calculate density shifts and further to adjust ink keys to minimize density variations 1338.

FIG. 14 details the color coordinate system used to compare colors. Each color is mathematically separated into its components of color (tint) and luminance (brightness) and assigned coordinates within the sphere (X, Y, Z). Color is charted along the X, Y plane and luminance along the Z axis. The sphere confines the space where all reproducible colors exist.

To determine the similarity of any pair of colors the distance between them within this space is computed using the formula $((X2-X1)^2+(Y2-Y1)^2+(Z2-Z1)^2)^{(1/2)}$. The larger the resulting number, the less similar the colors. Identical colors will have a distance value of zero.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for measuring and controlling a color value of one or more colored image portions which are printed on a planar substrate in a plurality of ink zones that extend across a width of the substrate, each colored image portion comprising one or more colors, wherein each color has a pure color value, the process comprising:

(a) providing one or more colored image portions which are printed on a planar substrate with a quantity of ink in a plurality of ink zones that extend across a width of the substrate, each colored image portion comprising one or more colors, wherein each color has a pure color value;

(b) providing a memory which contains pure color value information in digital form for each color;

(c) providing a pixellated digital representation of said one or more colored image portions, said pixellated digital representation being divided into a plurality of digital paths corresponding to each of said ink zones, each digital path comprising a plurality of digital zones, and said pixellated digital representation being further divided into one or more color layers, each color layer corresponding to one of said one or more colors, and wherein said pixellated digital representation comprises target color values that correspond to the quantity of ink required to reproduce the one or more colored image portions for each color within each ink zone on the substrate;

(d) analyzing each of the color layers within each of the digital paths to determine a maximum pixel population area for each color within each of said digital paths, the maximum pixel population area having position coordinates and comprising a location within the colored image portion within the digital zone of a digital path having the target color value that is the closest target color value to the pure color value for its corresponding color within its digital path, and storing the maximum pixel population area position coordinates and its color value in the memory;

(e) comparing and determining any difference between the target color value of said maximum pixel population area and the corresponding pure color value for each color, and storing said difference in the memory;

(f) providing at least one imaging assembly, wherein the imaging assembly is capable of capturing digital representations of said one or more colored image portions;

(g) controlling the positioning and linear movement of said imaging assembly across the planar substrate;

(h) selecting and acquiring one or more digital images with the imaging assembly of said one or more colored image portions on the substrate at the maximum pixel population area location for at least one of said colors in at least one of said ink zones, thereby producing the digital image of the substrate at the maximum pixel population area; said digital image of the substrate at the maximum pixel population area having an actual color value for said at least one color in said at least one of said ink zones;

(i) analyzing the digital image of the substrate at the maximum pixel population area and measuring the actual color value for said at least one color;

(j) comparing and determining any difference between the actual color value and the pure color value, and storing said difference in the memory; and (k) optionally adjusting the ink quantity on the substrate in the corresponding ink zone such that the difference between the actual color value and the pure color value is equivalent to the difference between said target color value and said pure color value determined in (e).

2. The process of claim 1 option of adjusting the ink quantity on the substrate in step (k) is performed.

3. The process of claim 1 further comprising repeating steps (g) through (k) to maintain color on the substrate such that the difference between the actual color value and the pure color value is equivalent to the difference between said target color value and said pure color value determined in (e) for each ink zone.

4. The process of claim 1 wherein steps (g) through (k) are repeated for each color of said one or more colored image portions.

5. The process of claim 1 wherein the target color values of said pixellated digital representation are obtained by scanning the substrate with a scanner.

6. The process of claim 1 wherein the target color values of said pixellated digital representation are obtained by scanning the substrate with said imaging assembly.

7. The process of claim 1 wherein said imaging assembly comprises a digital camera and at least one illumination source.

8. The process of claim 7 wherein the illumination source either continuously or intermittently illuminates the one or more colored image portions.

9. The process of claim 7 wherein the illumination source comprises a strobe comprising one or more white light emitting diodes.

10. The process of claim 7 wherein said image acquiring is conducted by:

(I) illuminating the substrate at the maximum pixel population area with the at least one illumination source; and (II) capturing an image of the substrate at the maximum pixel population area with the digital camera.

11. The process of claim 7 further comprising a linear drive for moving the illumination source and digital camera together across the substrate.

12. The process of claim 11 wherein the planar substrate is moving and the linear drive moves perpendicular to the direction of travel of the substrate.

13. The process of claim 11 wherein the planar substrate is stationary and the linear drive moves in two orthogonal directions relative to a surface of the planar substrate.

14. The process of claim 1 wherein said adjusting step is conducted by adjusting an ink control mechanism to increase or decrease the amount of ink printed onto the substrate in one or more ink zones.

15. The process of claim 1 further comprising presenting a visual representation of the one or more colored image portions, the maximum pixel population area, the actual, target and pure color values, a comparison of the color values, or combinations thereof, on a display screen.

16. The process of claim 1 further comprising selecting a locator mark from one of said ink zones on said substrate, determining position coordinates for the locator mark in said pixellated digital representation, comparing the coordinates of the locator mark to the position coordinates of the one or more of said maximum pixel population areas, and directing the imaging assembly to said one or more of said maximum pixel population areas relative to the locator mark position coordinates.

17. A process for measuring and controlling a color value of one or more colored image portions which are printed on a planar substrate in a plurality of ink zones that extend across a width of the substrate, each colored image portion comprising one or more colors, wherein each color has a pure color value, the process comprising:

(a) providing one or more colored image portions which are printed on a planar substrate with a quantity of ink in a plurality of ink zones that extend across a width of the substrate, each colored image portion comprising one or more colors, wherein each color has a pure color value;

(b) providing a memory which contains pure color value information in digital form for each color;

(c) providing a pixellated digital representation of said one or more colored image portions, said pixellated digital representation being divided into a plurality of digital paths corresponding to each of said ink zones, each digital path comprising a plurality of digital zones, and said pixellated digital representation being further divided into one or more color layers, each color layer corresponding to one of said one or more colors, and wherein said pixellated digital representation comprises target color values that correspond to the quantity of ink required to reproduce the one or more colored image portions for each color within each ink zone on the substrate;

(d) analyzing each of the color layers within each of the digital paths to determine a maximum pixel population area for each color within each of said digital paths, the maximum pixel population area having position coordinates and comprising a location within the colored image portion within the digital zone of a digital path having the target color value that is the closest target color value to the pure color value for its corresponding color within its digital path, and storing the maximum pixel population area position coordinates and its color value in the memory;

(e) modifying the one or more colored image portions printed on the planar substrate by increasing or decreasing the quantity of ink in one or more of said ink zones, said modified one or more colored image portions having modified target color values;

(f) scanning the substrate with a scanner at each maximum pixel population area location and determining modified target color values for each of said maximum pixel population areas, and storing said modified target color values for each maximum pixel population area in the memory;

(g) comparing and determining any difference between the modified target color values of each maximum pixel population area and the corresponding pure color value for each color, and storing said difference in the memory;

(h) providing at least one imaging assembly, wherein the imaging assembly is capable of capturing digital representations of said one or more colored image portions;

(i) controlling the positioning and linear movement of said imaging assembly across the planar substrate;

(j) selecting and acquiring one or more digital images with the imaging assembly of said one or more colored image portions on the substrate at the maximum pixel population area location for at least one of said colors in at least one of said ink zones, thereby producing the digital image of the maximum pixel population area; said digital image of the maximum pixel population area having an actual color value for said at least one color in said at least one of said ink zones;

(k) analyzing the digital image of the maximum pixel population area and measuring the actual color value for said at least one color;

(l) comparing and determining any difference between the actual color value and the pure color value, and storing said difference in the memory; and (m) optionally adjusting the ink quantity on the substrate in the corresponding ink zone such that the difference between the actual color value and the pure color value is equivalent to the difference between said modified target color value and said pure color value determined in (g).

18. The process of claim 17 wherein the option of adjusting the ink quantiy on the sustrate in step (M) is performed.

19. The process of claim 17 further comprising repeating steps (i) through (m) to maintain color on the substrate such that the difference between the actual color value and the pure color value is equivalent to the difference between said target color value and said pure color value determined in (g) for each ink zone.

20. The process of claim 17 wherein scanning step (f) is conducted with the imaging assembly of (h).

21. A process for controlling an amount of ink fed from a plurality of inking units in a multicolored printing press onto a planar substrate fed through the press, which substrate is in a web or sheet form, said substrate having one or more colored image portions printed thereon from the inking units, which image portions are printed across a width of the substrate in a plurality of ink zones, each colored image portion comprising one or more colors, wherein each color has a pure color value, the system being capable of functioning in the presence of or absence of a color bar, the process comprising:

(a) providing one or more colored image portions which are printed on a planar substrate with a quantity of ink in a plurality of ink zones that extend across a width of the substrate, each colored image portion comprising one or more colors, wherein each color has a pure color value;

(b) providing a memory which contains pure color value information in digital form for each color;

(c) providing a pixellated digital representation of said one or more colored image portions, said pixellated digital representation being divided into a plurality of digital paths corresponding to each of said ink zones, each digital path comprising a plurality of digital zones, and said pixellated digital representation being further divided into one or more color layers, each color layer corresponding to one of said one or more colors, and wherein said pixellated digital representation comprises target color values that correspond to the quantity of ink required to reproduce the one or more colored image portions for each color within each ink zone on the substrate;

(d) determining whether a color bar is present, which color bar comprises a plurality of color patches, wherein at least one color patch is printed in each ink zone, wherein each color patch comprises one or more color layers; and (e) if a color bar is not present, conducting step (I), and if a color bar is present conducting either step (I) or step (II):

(I) (f) analyzing each of the color layers within each of the digital paths to determine a maximum pixel population area for each color within each of said digital paths, the maximum pixel population area having position coordinates and comprising a location within the colored image portion within the digital zone of a digital path having the target color value that is the closest target color value to the pure color value for its corresponding color within its digital path, and storing the maximum pixel population area position coordinates and its color value in the memory;

(g) comparing and determining any difference between the target color value of said maximum pixel population area and the corresponding pure color value for each color, and storing said difference in the memory;

(h) providing at least one imaging assembly, wherein the imaging assembly is capable of capturing digital representations of said one or more colored image portions;

(i) controlling the positioning and linear movement of said imaging assembly across the planar substrate;

(j) selecting and acquiring one or more digital images with the imaging assembly of said one or more colored image portions on the substrate at the maximum pixel population area location for at least one of said colors in at least one of said ink zones, thereby producing the digital image of the maximum pixel population area; said digital image of the maximum pixel population area having an actual color value for said at least one color in said at least one of said ink zones;

(k) analyzing the digital image of the maximum pixel population area and measuring the actual color value for said at least one color;

(l) comparing and determining any difference between the actual color value and the pure color value, and storing said difference in the memory; and (m) optionally adjusting the ink quantity on the substrate in the corresponding ink zone such that the difference between the actual color value and the pure color value is equivalent to the difference between said target color value and said pure color value determined in (g);

(II) (n) providing at least one imaging assembly, wherein the imaging assembly is capable of capturing digital representations of said one or more colored image portions;

(o) controlling the positioning and linear movement of said imaging assembly across the planar substrate;

(p) selecting and acquiring one or more digital images with the imaging assembly of one or more of said color patches, thereby producing a digita image of the one or more color patches; said digital image of the one or more color patches having an actual color value for each of its one or more color layers;

(q) analyzing the digital image of the one or more color patches and measuring the actual color value for said one or more color layers;

(r) comparing and determining any difference between the actual color value and the pure color value, and storing said difference in the memory; and (s) optionally adjusting the ink quantity on the substrate in the corresponding ink zone such that there is no difference between the actual color value and the pure color value.

22. The process of claim 21 further comprising selecting a locator mark from one of said ink zones on said substrate, determining position coordinates for the locator mark in said pixellated digital representation, comparing the position coordinates of the locator mark to the position coordinates of the one or more of said maximum pixel population areas, and directing the imaging assembly to said one or more of said maximum pixel population areas relative to the locator mark position coordinates.

23. The process of claim 21 wherein a color bar is present and further comprising selecting at least one locator mark from at least one of said ink zones on said substrate, wherein said at least one locator mark comprises a patch of the color bar, determining position coordinates for the at least one locator mark in said pixellated digital representation, determining position coordinates for each ink zone, comparing the position coordinates of the at least one locator mark to the position coordinates of either said maximum pixel population areas if (I) or to the position coordinates of at least one ink zone if (II), and directing the imaging assembly to said one or more of said maximum pixel population areas or said at least one ink zone relative to the locator mark position coordinates.

24. The process of claim 21 wherein said imaging assembly comprises a digital camera and at least one illumination source.

25. The process of claim 21 further comprising adjusting the ink quantity on the substrate in the corresponding ink zone such that there is no difference between the actual color value and the pure color value.

26. The process of claim 21 further comprising repeating steps (i) through (m) to maintain color on the substrate such that the difference between the actual color value and the pure color value is equivalent to the difference between said target color value and said pure color value determined in (g) for each ink zone; or repeating steps (o) through (s), such that there is no difference between the actual color value and the pure color value for each ink zone.

27. A color control system for measuring and controlling a color value of one or more colored image portions which are printed on a planar substrate in a plurality of ink zones that extend across a width of the substrate, each colored image portion comprising one or more colors, wherein each color has a pure color value, the system comprising:

(a) one or more colored image portions which are printed on a planar substrate with a quantity of ink in a plurality of ink zones that extend across a width of the substrate, each colored image portion comprising one or more colors, wherein each color has a pure color value;

(b) a memory for storing pure color value information in digital form for each color, and for storing a pixellated digital representation of said one or more colored image portions, said pixellated digital representation being divided into a plurality of digital paths corresponding to each of said ink zones, each digital path comprising a plurality of digital zones, and said pixellated digital representation being further divided into one or more color layers, each color layer corresponding to one of said one or more colors, and wherein said pixellated digital representation comprises target color values that correspond to the quantity of ink required to reproduce the one or more colored image portions for each color within each ink zone on the substrate;

(c) a first analyzer for analyzing each of the color layers within each of the digital paths to determine a maximum pixel population area for each color within each of said digital paths, the maximum pixel population area having position coordinates and comprising a location within the colored image portion within a the digital zone of a digital path having the target color value that is the closest target color value to the pure color value for its corresponding color within its digital path, which maximum pixel population area position coordinates and its color value are stored in the memory;

(d) a first comparator for comparing and determining any difference between the target color value of said maximum pixel population area and the corresponding pure color value for each color, which difference is stored in the memory;

(e) at least one imaging assembly, wherein the imaging assembly is capable of capturing digital representations of said one or more colored image portions;

(f) a controller for controlling the positioning and linear movement of said imaging assembly across the planar substrate;

(g) a selector for selecting and acquiring one or more digital images with the imaging assembly of said one or more colored image portions on the substrate at the maximum pixel population area location for at least one of said colors in at least one of said ink zones, thereby producing the digital image of the maximum pixel population area; said digital image of the maximum pixel population area having an actual color value for said at least one color in said at least one of said ink zones;

(h) a second analyzer for analyzing the digital image of the maximum pixel population area and measuring the actual color value for said at least one color;

(i) a second comparator for comparing and determining any difference between the actual color value and the pure color value, which difference is stored in the memory; and (j) an adjuster for optionally adjusting the ink quantity on the substrate in the corresponding ink zone such that the difference between the actual color value and the pure color value is equivalent to the difference between said target color value and said pure color value.

* * * * *